(12) United States Patent
Kageyama et al.

(10) Patent No.: US 6,292,725 B1
(45) Date of Patent: Sep. 18, 2001

(54) INTERFERENCE PREVENTING DEVICE FOR VEHICLE

(75) Inventors: Masato Kageyama, Oyama; Kiyoshi Kaneko, Urawa; Shu Takeda, Kawasaki; Masanori Tojima, Kawasaki; Koji Takeda, Kawasaki, all of (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 09/402,236

(22) PCT Filed: Mar. 4, 1998

(86) PCT No.: PCT/JP98/01551

§ 371 Date: Jan. 27, 2000

§ 102(e) Date: Jan. 27, 2000

(87) PCT Pub. No.: WO98/45765

PCT Pub. Date: Oct. 15, 1998

(30) Foreign Application Priority Data

Apr. 4, 1997 (JP) .................................................. 9-086612
Feb. 13, 1998 (JP) ................................................. 10-031532

(51) Int. Cl.[7] ...................................................... G01S 13/93
(52) U.S. Cl. ................................ 701/30; 701/23; 701/24; 180/169
(58) Field of Search ................................... 182/167, 168, 182/169; 701/23, 25, 26, 27, 200, 96, 301, 300

(56) References Cited

U.S. PATENT DOCUMENTS

| 5,881,832 | * | 3/1999 | Zitz et al. | 180/169 |
| 5,885,265 | * | 2/1999 | Matzumoto | 180/169 |
| 5,955,967 | * | 9/1999 | Yamada et al. | 701/301 |
| 6,009,368 | * | 12/1999 | Labahn et al. | 701/96 |
| 6,157,892 | * | 12/2000 | Hada et al. | 180/169 |

FOREIGN PATENT DOCUMENTS

| 6258313 | 3/1987 | (JP) . |
| 63150710 | 6/1988 | (JP) . |
| 7014100 | 1/1995 | (JP) . |
| 8263140 | 10/1996 | (JP) . |
| 9171599 | 6/1997 | (JP) . |
| 9244745 | 9/1997 | (JP) . |

* cited by examiner

Primary Examiner—Richard M. Camby
(74) Attorney, Agent, or Firm—Varndell & Varndell, PLLC

(57) ABSTRACT

The present invention prevents the interference of vehicles traveling on-coming to each other when a plurality of vehicles are traveling on-coming to each other on a traveling path with a predetermined road width without increase in cost caused by setting a wide course width and without a drop in work efficiency caused by decreasing velocity. If one of the vehicles detects the other vehicle by its obstacle detection means when the vehicles are traveling on-coming to each other, the vehicle which detects the other vehicle begins deceleration to stop itself. At the same time, this vehicle transmits a deceleration control command for stopping the other vehicle to the other vehicle via transmission/reception means, therefore the other vehicle starts deceleration even if this vehicle cannot detect an obstacle. The present invention is also applied when unmanned vehicles using autonomously guidance traveling based on the course data and traveling position data or an unmanned vehicle and a manned vehicle pass each other on the going and coming paths immediately adjacent to each other, where each vehicle has communication means for transmitting traveling position data of the respective vehicle and receiving traveling position data of the other vehicle, an unmanned vehicle has approach detection means for detecting the approach of the other vehicle based on its own traveling position data and position data of the other vehicle, and traveling control means for shifting its own vehicle toward the road shoulder side at detection of an approach.

32 Claims, 13 Drawing Sheets

CONCEPTUAL DIAGRAM DEPICTING
AN EXAMPLE OF A TRAVELING COURSE

A BLOCK DIAGRAM DEPICTING AN EMBODIMENT OF
THE TRAVELING CONTROL EQUIPMENT IN ACCORDANCE
WITH THE PRESENT INVENTION

FLOW CHART DEPICTING AN EXAMPLE OF INTERFERENCE PREVENTION PROCEDURE TO BE EXECUTED BY THE PROCESSING SECTION

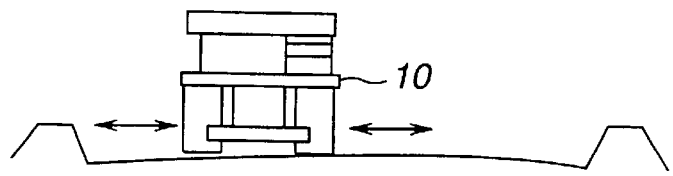

TRAVELING ERROR RANGE AT HIGH-SPEED TRAVELING (WHEN NOT PASSING)

A CONCEPTUAL DIAGRAM DEPICTING A TRAVELING MODE WHEN UNMANNED VEHICLES DO NOT PASS EACH OTHER

FIG.13

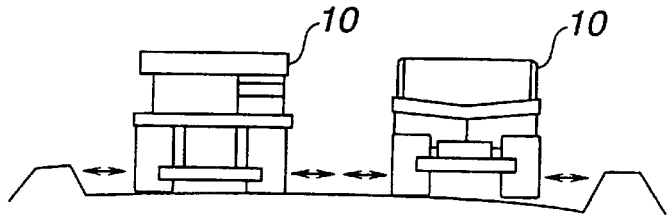

TRAVELING ERROR RANGE AT LOW-SPEED TRAVELING (WHEN PASSING)

A CONCEPTUAL DIAGRAM DEPICTING A TRAVELING MODE WHEN UNMANNED VEHICLES PASS EACH OTHER

FIG.14

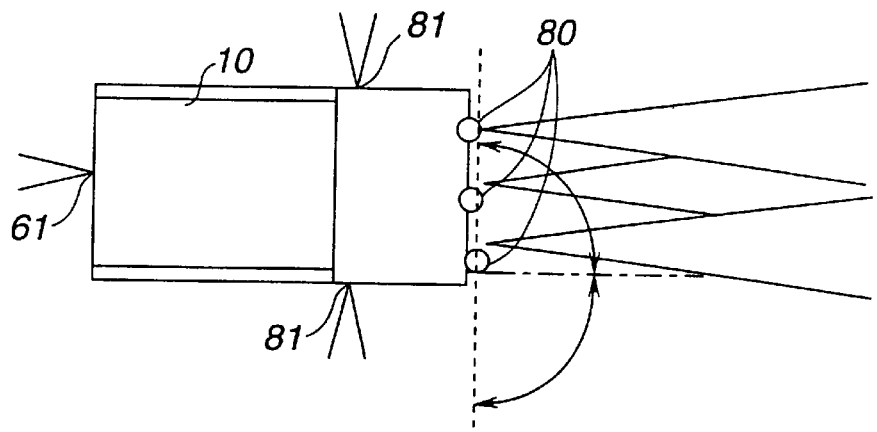

A PLAN VIEW DEPICTING EQUIPPING MODE OF OBSTACLE SENSORS

FIG.15

A CONCEPTUAL DIAGRAM DEPICTING
AN EXAMPLE OF A TRAVELING COURSE

A METHOD SEPARATING THE COURSE INTO TWO,
ONE FOR GOING AND THE OTHER FOR COMING

A CONCEPTUAL DIAGRAM DEPICTING
A CONFIGURATION EXAMPLE OF A TRAVELING COURSE

A METHOD FOR CREATING TWO LANES ON ONE COURSE
SO THAT ON-COMING VEHICLES CAN PASS EACH OTHER

A CONCEPTUAL DIAGRAM DEPICTING ANOTHER
CONFIGURATION EXAMPLE OF A TRAVELING COURSE

A METHOD FOR CREATING ONE LANE ON ONE COURSE
AND USING A STANDBY AREA FOR PASSING EACH OTHER

A CONCEPTUAL DIAGRAM DEPICTING STILL ANOTHER
CONFIGURATION EXAMPLE OF A TRAVELING COURSE

INTERFERENCE PREVENTING DEVICE FOR VEHICLE

TECHNICAL FIELD

The present invention relates to a vehicle interference prevention system for preventing the mutual interference of vehicles when a plurality of vehicles are traveling on-coming to each other in a traveling path with a predetermined road width.

BACKGROUND ART

In order to manage the movement of a plurality of unmanned vehicles, unmanned dump trucks for example, for transporting soil in a wide area working site, such as a quarry and mine, a monitoring station is established as a ground station, and a vehicle monitoring system is structured such that this monitoring station manages and monitors these unmanned vehicles comprehensively.

As a method for controlling the traveling of these unmanned vehicles according to a predetermined traveling path in a working site, the following two types of methods have been used.
1) Guide wire (guide marker) traveling control system
2) Autonomous traveling control system The above 1) guide wire (guide marker) traveling control system controls the traveling of vehicles by actually disposing guide wires (guide markers), such as rails and magnetic nails, along a predetermined traveling path, so that deviation from the guide wire (guide marker) is minimized.

In this system, it is unlikely that the unmanned vehicles will extensively deviate from the predetermined traveling path, but initial investment is enormous since rails and magnetic nails must be disposed along the predetermined traveling paths, and also the predetermined traveling paths cannot be freely changed since the guide wires must be disposed all over again to change the predetermined traveling paths. Particularly, in such a working site as a mine, where the predetermined traveling paths are frequently changed, this problem is critical.

As a consequence, the above 2) autonomous traveling control system using positional measurement by dead reckoning, inertial navigation and GPS, is adopted in such a working site as a mine. This autonomous traveling control system controls vehicles to travel along predetermined traveling paths while comparing pre-stored position data of the predetermined traveling path with the actually measured positions of the vehicles, with the advantage that it is unnecessary to dispose the guide wires, therefore initial investment is low, and predetermined traveling paths can be freely changed compared with the 1) guide wire (guide marker) control system.

In this autonomous traveling control system, however, traveling control errors occur due to positional measurement errors, and it is more likely that the unmanned vehicles will extensively deviate from the predetermined traveling paths compared with the guide wire (guide marker) control system.

In a large scale mine, one traveling course, where vehicles travel on-coming to each other, is often disposed rather than disposing two parallel courses, so as to decrease investment for long distance courses.

In other words, there are two methods for setting a course for unmanned vehicles, setting two courses for going and coming traffic independently (see FIG. 17), and setting one course for going and coming traffic (see FIG. 16).

When one course is set for going and coming traffic, two lanes are created on one course so that vehicles can pass each other (see FIG. 18), or one lane is created on one course where if on-coming vehicles pass each other, one vehicle waits at a standby area (see FIG. 19).

In terms of investment to build a course, it is best to use only one lane for both going and coming traffic while creating standby areas, but in this case, productivity during operation decreases since a vehicle waits for an on-coming vehicle at a standby area. The other methods are not very different in terms of productivity during operation, but initial investment is much lower in building one course compared with building different courses for going and coming traffic.

When on-coming unmanned vehicles pass each other in this manner, there is a danger that one unmanned vehicle will deviate from the predetermined traveling path and cause a collision. To prevent such a collision of unmanned vehicles, the width of the course must be set extremely wide, which increases cost in establishing the course.

Also, in order to prevent a head on collision with an on-coming vehicle, the unmanned vehicles must pass each other while slowing down the respective vehicle speeds. This slow down of speed drops the work efficiency of the unmanned vehicles.

With the foregoing in view, it is an object of the present invention to prevent interference of vehicles when a plurality of vehicles are traveling on-coming to each other on a traveling path with a predetermined road width while minimizing an increase in cost caused by setting a wide course width, without a drop in work efficiency caused by decreasing velocity.

DISCLOSURE OF THE INVENTION

A first aspect of the present invention is a vehicle interference prevention system for preventing a mutual interference of vehicles when a plurality of vehicles traveling on-coming to each other on a traveling path with a predetermined road width, characterized in that:
  each one of the plurality of vehicles is provided with obstacle detection means for detecting an obstacle in front of the vehicle;
  each one of the plurality of vehicles is provided with transmission/reception means for transmitting/receiving data on own vehicle to/from other vehicle between the plurality of vehicles via a communication system which enables wireless communication over distances between the plurality of vehicles; and
  each one of the plurality of vehicles is provided with deceleration control means for starting deceleration to stop the own vehicle and transmitting a deceleration control command for stopping other vehicle to the other vehicle via the transmission/reception means if a vehicle detects the other vehicle by its obstacle detection means when the vehicles are traveling on-coming to each other.

According to this configuration, when one vehicle detects other vehicle by its obstacle detection means when the vehicles are traveling on-coming to each other, the vehicle which detected the other vehicle starts deceleration to stop itself. At the same time, the vehicle transmits a deceleration control command to the other vehicle to stop the other vehicle via the transmission/reception means.

In this way, the vehicles traveling on-coming to each other can quickly recognize the possibility of interference between the vehicles, and can start immediate deceleration, therefore interference of the vehicles traveling on-coming to each other can be prevented without fail, without setting the width of the course to be wide. Also, deceleration can start at the point when one vehicle detects the other vehicle via the obstacle detection means, therefore a decrease in velocity can be minimized.

As a result, when a plurality of vehicles are traveling on-coming to each other on a traveling path with a predetermined width, the interference of vehicles traveling on-coming to each other can be prevented, without involving an increase in cost caused by setting a course width to be wide or without involving a drop in work efficiency caused by decreasing velocity.

A second aspect of the present invention is a vehicle interference prevention system to be applied when unmanned vehicles using autonomous guidance traveling based on course data and traveling position data, or an unmanned vehicle and a manned vehicle pass each other on adjacent going and coming paths, characterized in that each one of the vehicles is provided with communication means for transmitting traveling position data on own vehicle and for receiving traveling position data of other vehicle, and the unmanned vehicle is provided with approach detection means for detecting an approach of the other vehicle based on the traveling position data on the own vehicle and the position data on the other vehicle, and traveling control means for shifting the own vehicle toward a road shoulder side at the detection of approach.

Since an unmanned vehicle has guidance errors caused by the accuracy of position measurement, guidance control, and course data measurement, it is safest to travel the course near the center to prevent deviation from the course (or to build a course with sufficient width, but in this case the initial investment is high).

However, when vehicles traveling in opposite directions pass each other, a head on collision, which is a more dangerous state, may occur.

According to the above second aspect of the present invention, when another vehicle approaches a vehicle, the vehicle to which another vehicle approaches is shifted to the road shoulder side, therefore interference with the on-coming vehicle while passing each other can be prevented.

Normally soil is piled up on the shoulder of a road at a mine site for vehicles which deviate from the course, and there is safe turnout for cars outside the course. This means that it is unlikely that vehicles will be damaged even if they deviate from the course.

An unmanned vehicle generally has an obstacle sensor. This obstacle sensor is set for the obstacle detection area to be wider than the width of the vehicle, to compensate for the above mentioned guidance errors and errors in the detection area of the obstacle sensor.

When the vehicle is shifted to the road shoulder side by mistake due to a guidance control error, for example, this obstacle sensor detects an obstacle outside the course first, and controls the vehicle to stop to prevent danger.

In order to prevent this stop by the obstacle sensor, that is, to prevent a decrease in productivity, it is preferable for vehicles to travel the course near the center as much as possible.

According to the second aspect of the present invention, vehicles travel the course near the center, and when vehicles pass each other, the vehicles travel the course near the road shoulder side, therefore by this traveling format, the possibility of detection errors of the obstacle sensors can be minimized, and the possibility of collision of the vehicles can be prevented without building a huge course with a wide course width, which requires a large initial investment.

BRIEF DESCRIPTION OF THE DRAWINGS

FIG. 13 is a conceptual diagram depicting a traveling mode when unmanned vehicles do not pass each other;

FIG. 14 is a conceptual diagram depicting a traveling mode when unmanned vehicles pass each other;

FIG. 15 is a plan view depicting an equipping mode of an obstacle sensor;

BEST MODE FOR CARRYING OUT THE INVENTION

Embodiments of the present invention will now be described with reference to the accompanying drawings.

At first, the first aspect of the present invention will be described with reference to FIG. 1–FIG. 9.

Figure 1:
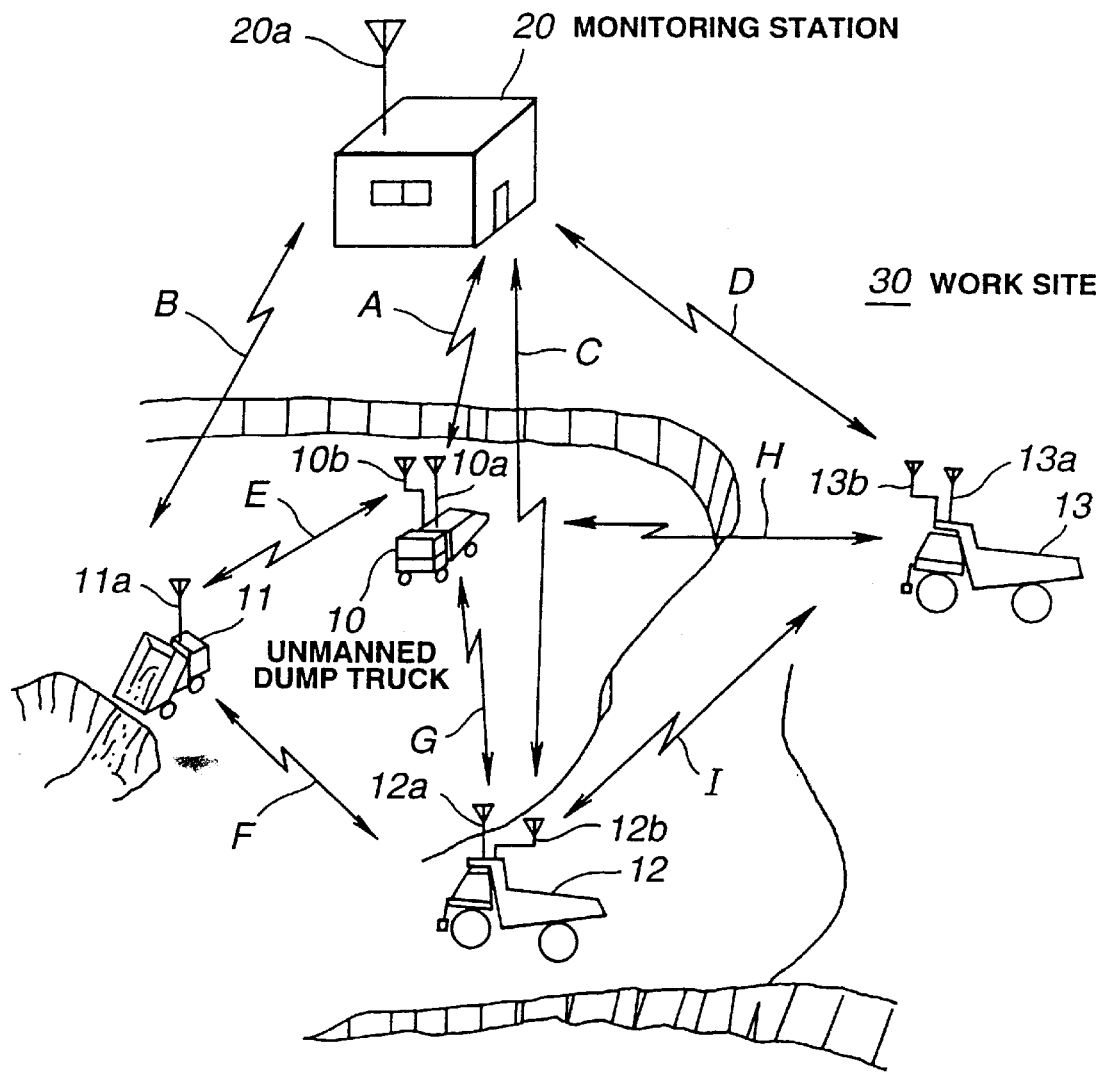
FIG. 1 is a drawing depicting the appearance of the entire unmanned dump truck monitoring system which is an embodiment of a vehicle interference prevention system in accordance with the first aspect of the present invention.

FIG. 1 shows the appearance of an unmanned dump truck monitoring system which manages and monitors many unmanned dump trucks 10, 11, 12, 13, . . . in a wide area working site 301, a mine for example, which is assumed in the present embodiment.

Figure 2:
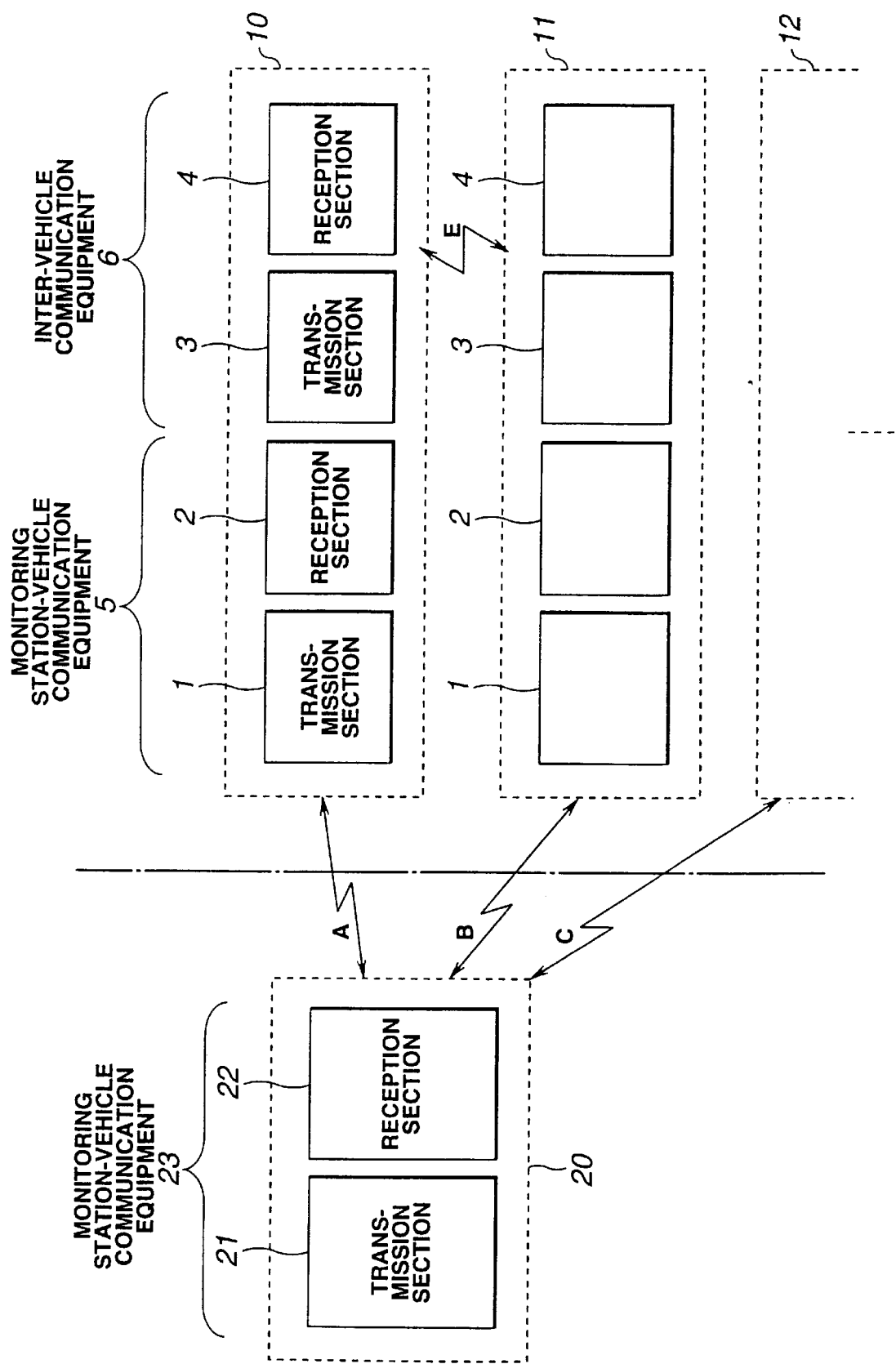
FIG. 2 is a block diagram depicting a configuration of a communication system of the embodiment.

FIG. 2 is a block diagram depicting only a wireless communication system of this unmanned dump truck monitoring system.

As FIG. 1 shows, this unmanned dump truck monitoring system comprises a plurality of unmanned dump trucks (hereafter vehicles) 10, 11, 12, 13, . . . having a later described vehicle position measurement equipment for measuring a respective vehicle position (X, Y), and a monitoring station 20, which receives the position data (X, Y) transmitted from each one of the plurality of vehicles 10, . . . , monitors the mutual positional relationships of the plurality of vehicles 10, . . . and transmits command data for instructing traveling and stopping to the plurality of vehicles 10, . . . based on the received position data.

In this embodiment, unmanned dump trucks are assumed to be unmanned vehicles, but the present invention can be applied to manned vehicles or vehicles other than dump trucks, wheel loaders and hydraulic shovels for example, or can be applied to a system where these unmanned vehicles and manned vehicles coexist, or a system where dump trucks, wheel loaders and hydraulic shovels coexist.

As FIG. 2 shows, wireless communication is performed between the monitoring station 20 and the plurality of vehicles 10, . . . via monitoring station-vehicle communication equipment 23 and 5.

Over the distances between the monitoring station 20 and the plurality of vehicles 10, . . . , that is, throughout the entire region of the wide area working site 30, a communication system which enables wireless communication, such as monitoring station-vehicle communication equipment 23 and 5 based on a VHF system, is disposed in the monitoring station 20 and the plurality of vehicles 10, . . . respectively, and the above mentioned position data and the command data are transmitted/received between the monitoring station 20 and the plurality of vehicles 10.

The monitoring station-vehicle communication equipment 23 at the monitoring station 20 side comprises a transmission section 21 and a reception section 22, and the monitoring station-vehicle communication equipment 5 at the vehicle 10 side comprises a transmission section 1, and a reception section 2, where wireless communication A is performed via an antenna 20a of the monitoring station 20 and an antenna 10a of the vehicles 10, as shown in FIG. 1. For the other vehicles as well, wireless communication B is performed via the antenna 20a of the monitoring station and an antenna 11a of the vehicle 11, wireless communication C is performed via the antenna 20a of the monitoring station 20 and an antenna 12a of the vehicle 12, and wireless communication D is performed via the antenna 20a of the monitoring station 20 and an antenna 13a of the vehicle 13.

Descriptions on control based on the communication of this monitoring station-vehicle communication equipment are omitted here since this is not directly related to the subject of the present invention.

Wireless communication is performed between the plurality of vehicles as well by inter-vehicle communication equipment 6.

In other words, the inter-vehicle communication equipment 6, which enables wireless communication over the distances between the plurality of vehicles and enables faster data transmission/reception than the above mentioned monitoring station-vehicle communication equipment 23 and 5 by SS wireless communication for example, is disposed in each vehicle 10, 11, 12, 13, . . . , and the above position data and various data such as the later mentioned control command data are transmitted/received between the plurality of vehicles.

The inter-vehicle communication equipment 6 of the vehicles 10, . . . comprises a transmission section 3 and a reception section 4, and as FIG. 1 shows, wireless communication E is performed via the antenna 10b of the vehicle 10 and the antenna 11b of the vehicle 11, wireless communication F via the antenna 11b of the vehicle 11 and the antenna 12b of the vehicle 12, wireless communication G via the antenna 10b of the vehicle 10 and the antenna 12b of the vehicle 12, wireless communication H via the antenna 10b of the vehicle 10 and the antenna 13b of the vehicle 13, and wireless communication I via the antenna 12b of the vehicle 12 and the antenna 13b of the vehicle 13 respectively. Wireless communication may be impossible between vehicles where the distance is greater than the radio wave propagation distance (e.g. between vehicles 11 and 13).

An arithmetic processing unit comprised of a CPU, memory and other components is equipped on each vehicle 10, . . . so that processing based on the later mentioned dead reckoning is performed, and control signals are output to e.g. each electromagnetic proportional control valve for driving the vehicles.

Figure 3:
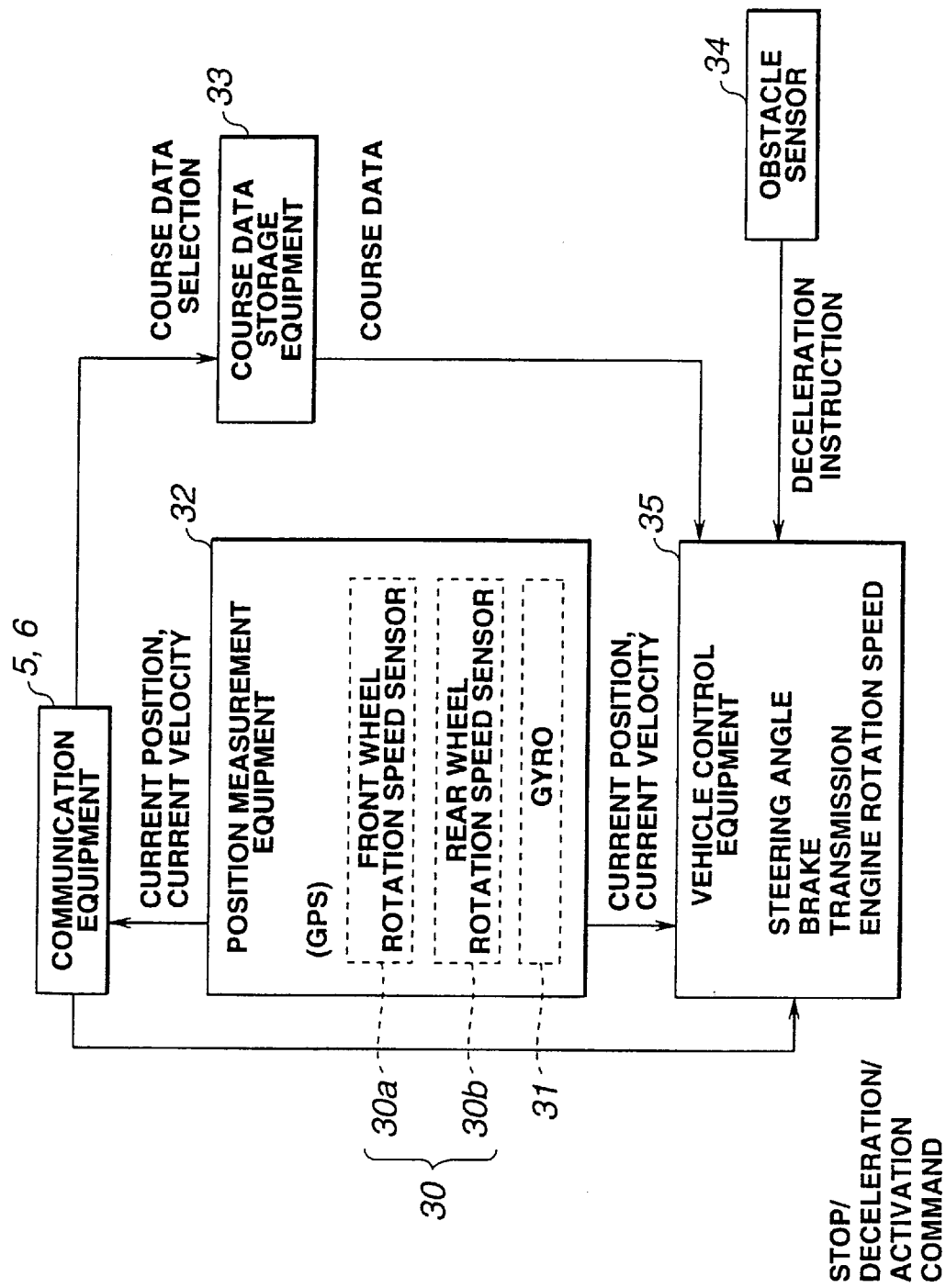
FIG. 3 is a block diagram depicting a configuration of equipment provided on an unmanned vehicle.

FIG. 3 is a block diagram depicting a configuration of the equipment provided in unmanned dump trucks (unmanned vehicles) which are assumed in the present embodiment.

As FIG. 3 shows, the equipment provided in the unmanned vehicles comprises a CPU, a position measurement equipment 32 for measuring the current position (X, Y) of the respective vehicle (e.g. vehicle 10), the above mentioned communication equipment 5 and 6, a course data storage equipment 33 where the later mentioned course data to indicate a predetermined traveling path 40 is stored, a later mentioned obstacle sensor 34 and a vehicle control equipment 35 for controlling the drive of the respective vehicle 10.

The vehicle control equipment 35 controls the steering angle, brakes, transmission and engine rotation speed based on the data on the current position and the current velocity of the vehicle 10 measured by the position measurement equipment 32, the command data to indicate such commands as stop and deceleration from the monitoring station 20 received by the monitoring station-vehicle communication equipment 5, the control data to indicate such control commands as deceleration received from another vehicle via the inter-vehicle communication equipment 6, the detection signal of the obstacle sensor 34, and the course data stored in the course data storage equipment 33.

In other words, the target engine rotation speed is set, and the fuel oil consumption is controlled according to the electric signals to be applied to an electronic control governor to change the engine rotation speed. The engine rotation sensor detects the actual rotation speed of the engine, and this detection signal is used as a feedback signal of the engine rotation speed control.

If a forward/backward clutch is in a forward or backward state (not neutral), the power of the engine is transferred to the tires via the torque converter, transmission, propeller shaft and differential gear, and the traveling speed of the vehicle 10 is changed by the change of the engine rotation.

The hydraulic pump is driven by the engine, and the pressure oil of the hydraulic pump is applied to the hydraulic actuator for driving the load carrying platform, and at the same time, the pressure oil of the hydraulic pump is supplied to a steering cylinder for driving the steering via the steering hydraulic solenoid proportional control valve, and the steering is driven according to the electric signals to be applied to the steering hydraulic solenoid proportional control vale, changing the steering angle.

The target value of the brake pressure is set, and the brake pressure is changed according to the electric signals to be applied to the brake pneumatic solenoid proportional control valve, activating the brake. The brake has a brake pressure sensor for detecting the brake pressure, and this detection signal is used as a feedback signal of the brake pressure control.

Next the functions of the position measurement equipment 32 will be described.

A tire rotation sensor 30 (e.g. dial pulse encoder), which is a vehicle traveling distance detection section, is disposed on the tires of the vehicle 10 to detect the rotation speed N of the tires. This tire rotation sensor 30 is disposed for front wheels 30a and for rear wheels 30b respectively. A gyro 31 (e.g. optical fiber gyro), which is a vehicle orientation detection section, is disposed on the body of the vehicle to detect the angular velocity of the orientation angle of the vehicle.

The vehicle position (X, Y) (a position on the 2-dimensional coordinate system X-Y) is detected based on the respective output of the above tire rotation sensor 30 and the gyro 31, as described later, but since this vehicle position includes accumulated errors due to tire slippage and other factors, the accumulated errors may be intermittently corrected, for example, by the relative positional relationship between the vehicle and reflection poles, which are disposed intermittently along the predetermined traveling path of the vehicle.

The vehicle position may be measured by a GPS (Global Positioning System) rather than measuring the vehicle position based on the output signals of the tire rotation sensor and the output signals of the gyro, as mentioned above. Also, an inertial navigation system or various beacons may be used. It is also possible to measure the position by combining these methods.

Arithmetic processing based on the detection signal of the tire rotation sensor 30, which is a vehicle traveling distance detection section, and the detection signal of the gyro 31, which is a vehicle orientation detection section, will be explained next.

The processing content to be executed by the position measurement equipment 32 will be explained first.

When a detection signal of the tire rotation sensor 30, which is a vehicle traveling distance detection section, and a detection signal of the gyro 31, which is a vehicle orientation detection section, are input to the position measurement equipment 32, the following processing is sequentially executed.

Operation of the Vehicle Traveling Distance S

The tire rotation speed N is determined based on the detection signal of the tire rotation sensor 30.

Then the vehicle traveling distance S is calculated by the product of the tire rotation speed N and the known tire load radius r.

Operation of Vehicle Orientation $\theta$

The change of vehicle orientation $\Delta\theta$ is calculated by integrating the angular velocity $\omega$ of the orientation angle of the vehicle based on the detection signal of the gyro 31, and the current vehicle orientation $\theta$ from the initial vehicle orientation is calculated by adding the change of the orientation $\Delta\theta$ to the known initial orientation.

Operation of Vehicle Position (X, Y)

The vehicle coordinate position (X, Y) on an X-Y coordinate is determined by integrating the product of the above vehicle traveling distance S and sine sin and cosine cos of the vehicle orientation $\theta$, which is S·sin $\theta$, S·cos $\theta$.

Figure 9:
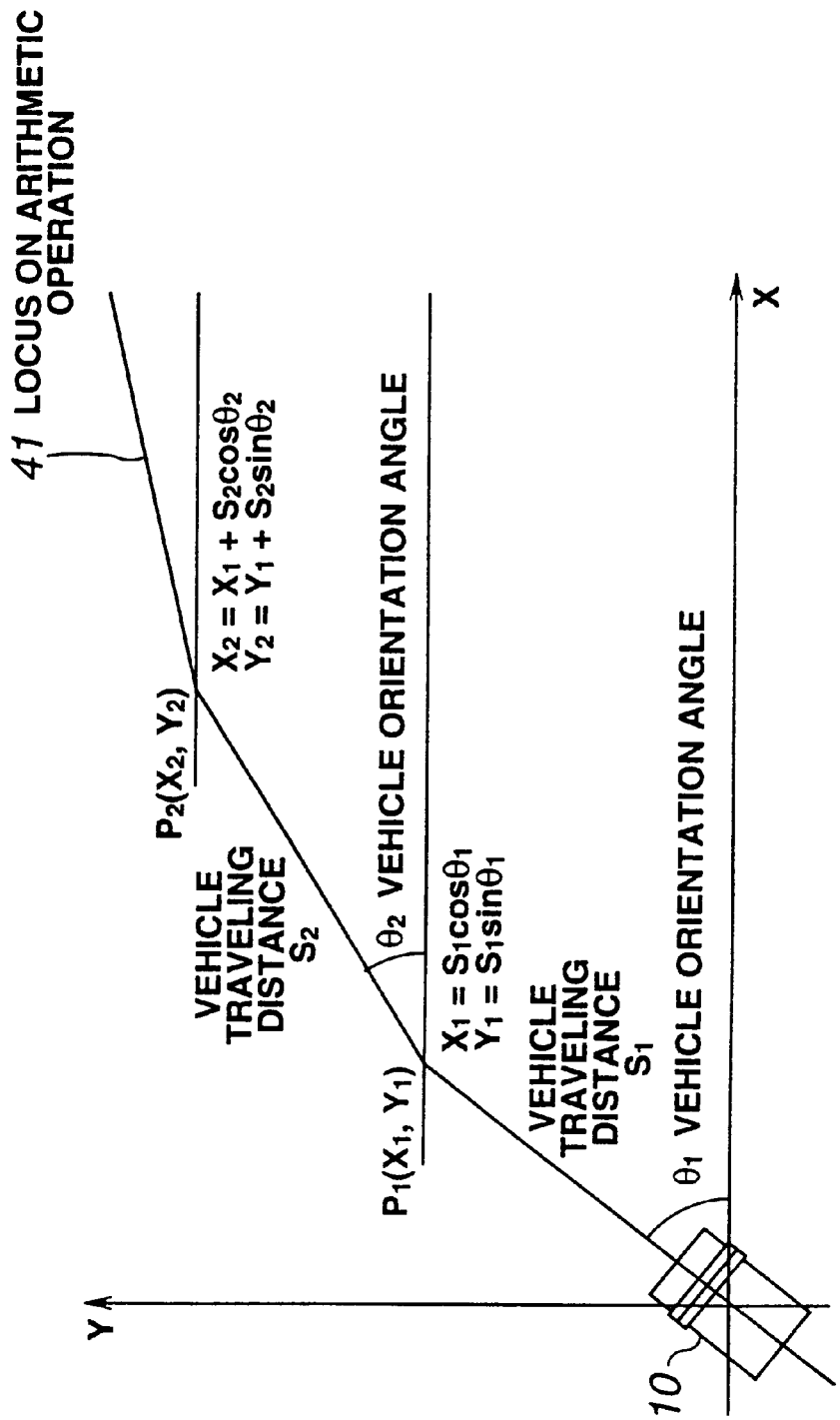
FIG. 9 is a drawing depicting dead reckoning.

In other words, as FIG. 9 shows, sequential vehicle positions P1 (X1, Y1)=(S1·cos $\theta$1, S1·sin $\theta$1), P2 (X2, Y2)=(X1+S2·cos $\theta$2, Y1+S2·sin $\theta$2), . . . are calculated and the arithmetic locus 41 of each vehicle, the vehicle 10 for example, is determined.

The vehicle control equipment 35 compares the locus 41 of the vehicle 10 (current position P), which is computed as above, and the predetermined traveling path 40 (target point position P'), which is a target route, and controls the vehicle 10 based on dead reckoning so that the vehicle 10 traces the predetermined traveling path 40. In other words, the vehicle control equipment 35 outputs predetermined electric signals to the steering hydraulic solenoid proportional control valve and controls the steering angle of the steering so that the sequential target vehicle positions P'1, P'2, P'3 . . . and the target vehicle orientations $\theta$'1, $\theta$'2, $\theta$'3 . . . on the predetermined traveling path 40 are obtained. The vehicle control equipment 35 also outputs predetermined electric signals to the electronic control governor, the transmission solenoid valve, and to the brake pressure solenoid proportional control valve so that the sequential target vehicle positions and the target vehicle orientations on the predetermined traveling path 40 are obtained, and controls the rotation speed of the engine, velocity steps of the transmission and the brake pressure. In this way, the vehicle 10 is guided so as to travel along the predetermined traveling path 40. This is the same for the other vehicles 11, 12, . . . .

Figure 4:
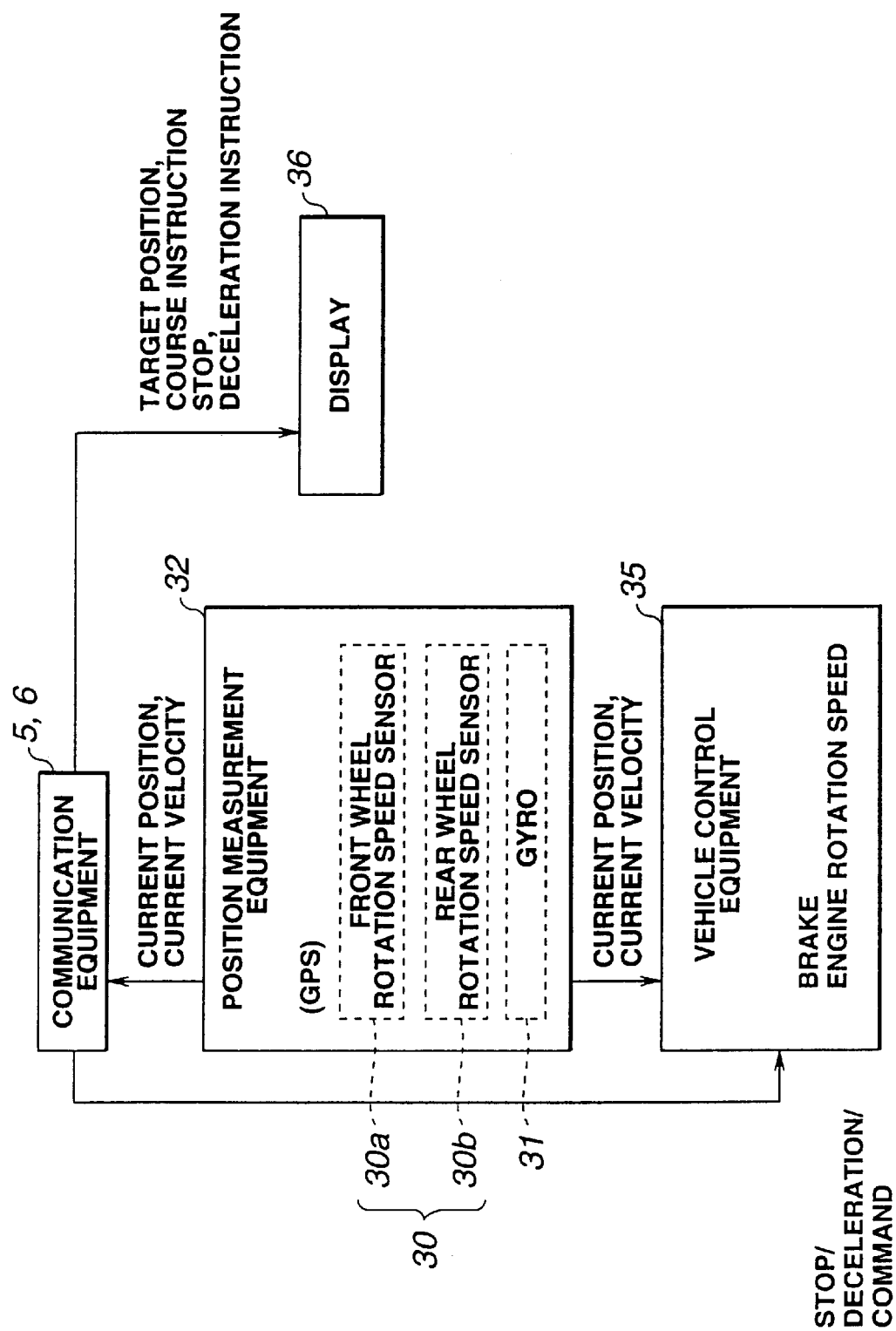
FIG. 4 is a block diagram depicting a configuration of equipment to be equipped on a manned vehicle.

When the monitoring system of the present embodiment includes a manned vehicle, the configuration of equipment provided in the manned vehicle is shown in FIG. 4.

In the vehicle control equipment 35', the steering angle, brake, transmission and engine rotation speed are basically controlled manually by an operator, but the brake and engine rotation speed may be controlled automatically.

In other words, the manned vehicle has a display 36 for displaying the content of the instruction data, such as instructions on the target position of the vehicle and the course to travel (predetermined traveling path), instructions to stop, instructions to decelerate transmitted from the monitoring station 20, and later mentioned control command data, which is input from another vehicle via the inter-vehicle communication equipment 6, and in normal cases, the operator controls various predetermined operations according to the content displayed on this display 36, and the operator manually controls the steering angle, brake, transmission and engine rotation speed.

If the contents of the instruction data and the control command data have not been executed when a predetermined time Tdelay elapsed since the instruction data and the control command data were displayed on this display 36, the brake and engine rotation speed are controlled automatically so as to execute the content of the instruction data and control command data automatically, and as a result, brake and engine rotation speed are automatically controlled and the manned vehicle automatically decelerates and stops.

Figure 7:
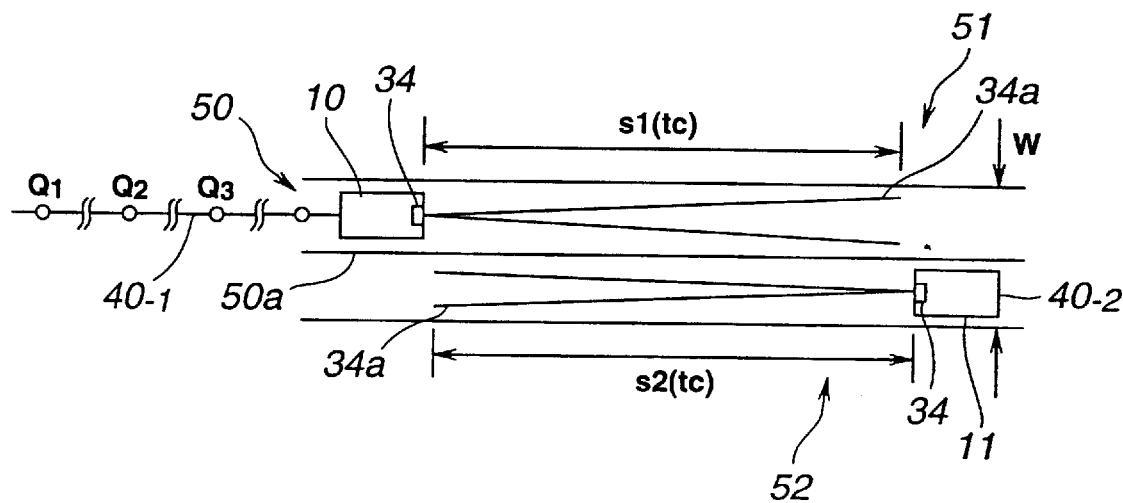
FIG. 7 is a drawing depicting interference prevention when the traveling path where vehicles are traveling on-coming to each other is a straight line.

Paths which the plurality of vehicles 10, . . . should travel are basically different depending on the vehicle, but as FIG. 7 shows, predetermined traveling paths 40-1 and 40-2 for different vehicles on which the vehicle 10 and vehicle 11 should travel, for example, are frequently set on one traveling path 50 with a predetermined road width W, where there are many chances that these vehicles 10 and 11 will travel from opposite directions and pass each other.

The data on the predetermined traveling path of each vehicle is stored in the course data storage equipment 33 of each vehicle by teaching. Then the monitoring station 20 transmits the instruction data to instruct the final target point (destination) to each vehicle 10, . . . via the transmission section 21 of the monitoring station-vehicle communication equipment 23 so as to start a playback operation. If position measurement is performed by GPS, the monitoring station 20 transmits the differential data of GPS to each vehicle.

As a result, each vehicle is guided to travel along the predetermined traveling path 40 based on the above mentioned dead reckoning, and a series of operations, including loading, transporting and unloading, are performed.

Control and Monitoring Between Vehicles

When the respective vehicles 10, . . . are traveling (operating), the position data is transmitted/received between the vehicles via the inter-vehicle communication equipment 6 disposed on the respective vehicle.

Since communication lines may jam if all vehicles transmit/receive data at the same time, priority can be assigned as follows.
1) Respective vehicles constantly transmit the position data of the respective vehicles to another vehicle via the inter-vehicle communication equipment 6, by which the respective vehicles confirm the presence of the vehicle traveling at the closest distance. Hereafter, the vehicles closest to each other frequently transmit/receive the position data via the inter-vehicle communication equipment 6 with priority.
2) The monitoring station 20 confirms the presence of the vehicles closest to each other based on the position data transmitted from the respective vehicles. The monitoring station 20 transmits this information to those vehicles closest to each other via the monitoring station-vehicle communication equipment 23 and 5. Hereafter, the vehicles closest to each other, to which this information was transmitted, frequently transmit/receive the position data via the inter-vehicle communication equipment 6 with priority.

The vehicles which are assigned priority in inter-vehicle communication perform control to prevent the mutual interference of the vehicles based on the received position data of the other vehicle.

In other words, when the vehicles are about to collide at a cross-section or when one vehicle is about to bump into another vehicle, it is decided which vehicle will decrease speed and which vehicle will advance.

Detailed descriptions are omitted here, but each vehicle transmits information on the segment Q1–Q2, Q2–Q3 . . . (see FIG. 7) where the vehicle exists, to the monitoring station 20, and here a segment refers to a block when the predetermined traveling path 40 is divided into a plurality of blocks, and the monitoring station 20 can judge how closely the vehicles have approached each other in segment units based on the above information. However, the monitoring station 20 can judge that different vehicles are traveling in a same segment but cannot judge how close the vehicles have approached each other within a segment.

So, the respective vehicles accurately judge the approach of another vehicle at a distance closer than the above segment distance using the inter-vehicle communication.

As a result, control when the vehicles approach each other at a very close distance, which the monitoring station 20 cannot control e.g. interference prevention control when the vehicles pass each other, becomes possible.

The vehicles judge mutual approach of the vehicle by transmitting/receiving the respective current position data via the inter-vehicle communication between the respective vehicles 10, . . . , but the accuracy of priority and accuracy of avoiding a collision when the vehicles enter a cross-section may be improved by transmitting/receiving the orientation data θ, velocity data, data on reliability (error) of position measurement, data on the deviation of the vehicle from the predetermined traveling path 40, data on the weight of the vehicle, and data on the distance to a cross-section as well. In the same way, the accuracy of velocity to decelerate and the accuracy of avoiding a collision when the vehicles pass each other may be improved by transmitting/receiving the orientation data θ, velocity data, data on the reliability (error) of position measurement, data on the deviation of the vehicle from the predetermined traveling path 40, data on the weight of the vehicle, and data on the effective detection distance of the obstacle detection sensor, as well as the position data.

In the case of the present embodiment, the vehicles transmit/receive data on the predetermined traveling path 40 of the respective vehicles to/from each other via the inter-vehicle communication, so that the spot where a head on collision may occur when the vehicles pass each other can be accurately estimated. The priority in this transmission/reception, too, can be assigned by the above mentioned methods 1) and 2).

Here the data on the predetermined traveling path 40 is data on the sequence of points indicating each spot P1, P2, P3 . . . on the predetermined path 40, and each spot P1, P2, P3 . . . has such information as two dimensional coordinate positions (X, Y) when a predetermined point in the working site is regarded as an origin, sight distance, and the velocity of the vehicle. The spots P1, P2, P3 . . . are divided at an interval required to pass each spot, one second for example, and therefore each spot P1, P2, P3 . . . and the estimated time to pass the spot t correspond to each other at a 1 to 1 ratio.

It is assumed that the obstacle sensor 34, which is disposed on each vehicle 10, 11, . . . is a plurality of sensors arranged in the axle direction of the body.

Next the processing content of the interference prevention control of the present embodiment will be described with reference to the flow chart in FIG. 5.

Interference Prevention Between Unmanned Vehicles

Figure 5:
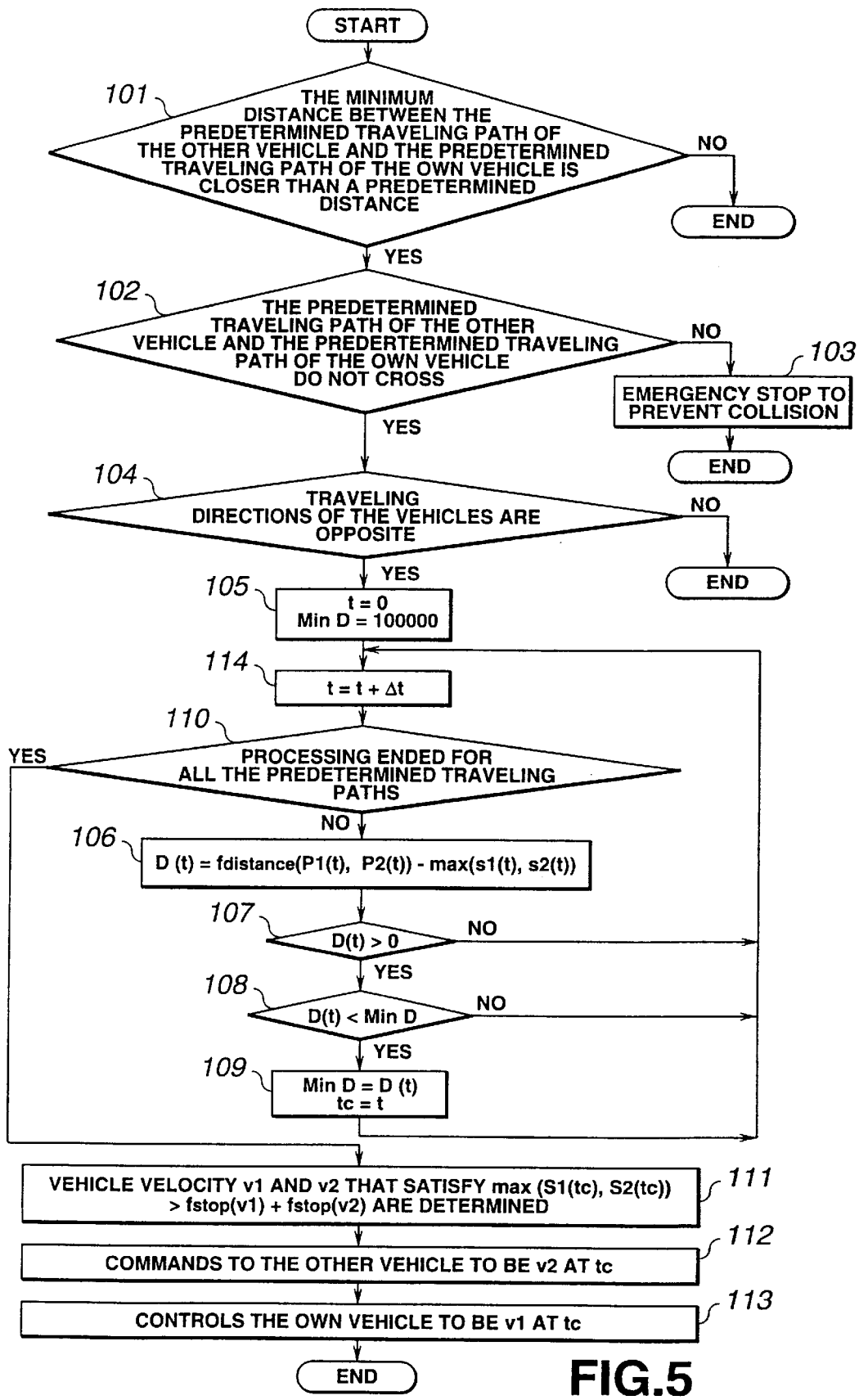
FIG. 5 is a flow chart depicting a processing procedure of the interference prevention control between unmanned vehicles.

FIG. 5 is a processing procedure to be applied when both of the vehicles which come from opposite directions and pass each other on the traveling path 50 are unmanned vehicles.

As FIG. 5 shows, each vehicle (e.g. vehicle 10) receives the data on the predetermined traveling path 40-2 of another vehicle (e.g. vehicle 11) via the inter-vehicle communication equipment 6, by which the vehicle 10 Judges whether the minimum distance between the predetermined traveling path 40-2 of the on-coming vehicle 11 and the predetermined traveling path 40-1 of the vehicle 10 (see FIG. 7) is shorter than the predetermined distance which was determined based on the road width of the traveling path 50 (distance where a vehicle and an on-coming vehicle may interfere with each other if one vehicle deviates from the predetermined traveling path). Different predetermined traveling paths may be far from each other, or may be on the same traveling path 50, as shown in FIG. 7, where the vehicles are very close to each other, therefore this judgment is made to know whether the respective predetermined traveling paths will ever be on the same traveling path 50 (Step 101).

Then the vehicle 10 judges that the predetermined traveling path 40-2 of the other vehicle 11 will cross the predetermined traveling path 40-1 of the vehicle 10. This judgment is made because when the predetermined traveling paths are close to each other, paths may cross each other, or may be because the vehicles are traveling on-coming to each other on the same path, as shown in FIG. 7 (Step 102). When the predetermined traveling paths cross each other, the vehicle 10 stops itself as an emergency to avoid the collision of the vehicles 10 and 11 (Step 103).

Then the vehicle 10 judges whether the vehicle 10 and the other vehicle 11 are traveling in opposite directions. This judgment is made because when the predetermined traveling paths exist on the same traveling path 50, the vehicle may be traveling in the same direction, or the vehicles may be traveling in opposite directions (Step 104).

If the result of the judgment in the above Steps 101–103 is all YES, that is, the case when the vehicle 10 and the vehicle 11 traveling in opposite directions will pass each other on the traveling path 50, the following procedure is executed to prevent interference, such has a head on collision, when passing each other.

At first, the vehicle 10 estimates the time t when the vehicle 10 and the other vehicle 11 will travel on-coming to each other on the traveling path 50, that is, the time when the vehicles will approach each other close enough that the obstacle sensor 34 of one vehicle can detect the other vehicle.

At this point, the time t is initialized to the current time 0, and the MinD is set to 100000 (very large number) (Step 105).

Then the D (t) is set according to the following expression (1), where the effective detection distances of the obstacle sensors 34 of the vehicle 10 and vehicle 11 at each time t are S1 (t) and S2 (t), and the position of the vehicle 10 and vehicle 11 at each time t are P1 (t) and P2 (t) respectively.

$$D(t)=f \text{ distance } (P1\ (t), P2\ (t))-\max\ (S1\ (t), S2(t)) \quad (1)$$

Figure 8:
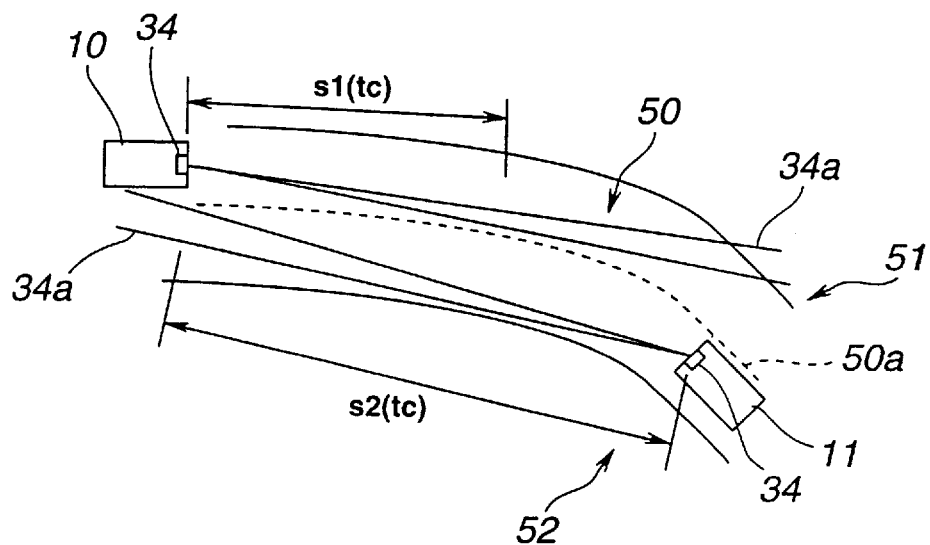
FIG. 8 is a drawing depicting interference prevention when the traveling path where vehicles are traveling on-coming to each other is a curve.

Here, the effective detection distance of the obstacle sensor 34 is the longest distance in which the sensor can detect when an on-coming vehicle is traveling into the traveling path of the vehicle, and can be geometrically determined from the positional relationship of the direction and the detection range 34a of the obstacle sensor and the median strip 50a of the traveling path 50 (see FIG. 7 and FIG. 8). Since the position where the detection range 34a of the sensor covers the median strip 50a of the traveling path 50 is different depending on whether the traveling path 50 is a straight line, as shown in FIG. 7, or whether the traveling path 50 is a curved line, as shown in FIG. 8, the effective detection distances S1 and S2 of the respective vehicles 10 and 11 are different in FIG. 7 and FIG. 8.

Also in the above expression (1), f distance (P1 (t), P2 (t)) is a function to determine a distance between the vehicles 10 and 11 using the positions of the vehicles 10 and 11 at time t, that is, P1 (t) and P2 (t), as variables (Step 106).

Then vehicle 10 judges whether the above D (t) is greater than 0 (Step 107), and whether this D (t) is lesser than MinD (Step 108).

If D (t) is not greater than 0 (NO in Step 107) and this D (t) is not lesser than MinD (NO in Step 108), then the processing in Steps 106–108 is repeatedly executed, but if D (t) is greater than o (YES in Step 107) and this D (t) is lesser than MinD (YES in Step 108), then the procedure advances to Step 109 and the content of MinD is set to the current D (t), and at the same time the content of tc is set to the current time t (Step 109).

Then the time t is advanced for a predetermined unit At (e.g. one second) (that is, the spots P1 (t) and P2 (t) are advanced) (Step 114), and it is judged whether the above Steps 106–109 have completed for all spots P1 (t) (corresponding to time t) of the predetermined traveling path 40-1 of the vehicle 10, and for all spots P2 (t) (corresponding to time t) of the predetermined traveling path 40-2 of the vehicle 11 (Step 110).

If it is judged that processing has not completed for all spots P1 (t) and P2 (t) (NO in Step 110), then the procedure returns to Step 106 again, and P1 (t), P2 (t), S1 (t) and S2 (t) in the above expression (1) are updated, a new D (t) is determined (Step 106), and hereafter the same processing is repeated (Steps 107–109).

When the processing of Steps 106–109 has completed for all spots P1 (t) of the predetermined traveling path 40-1 and for all spots P2 (t) of the predetermined traveling path 40-2 (YES in Step 110), time tc finally obtained in Step 109 is regarded as the time t when the vehicle 10 and the other vehicle 11 travel in opposite directions on the traveling path 50, that is, when the vehicles approach each other close enough that the obstacle sensor 34 of one vehicle can detect the other vehicle (at this time, D (t) reaches the minimum).

Next, a stop-possible velocity v1 and v2, at which each vehicle 10 and 11 on-coming to each other can stop without interruption if deceleration is started (without causing a head on collision even if a vehicle has deviated from the traveling path) is computed respectively by the following expression (2).

$$\max\ (S1\ (tc), S2\ (tc)) > f \text{ stop } (v1)+f \text{ stop } (v2) \quad (2)$$

The above expression (2) denotes that in order to stop both of the vehicles 10 and 11 without causing a collision when the obstacle sensor 34 of one vehicle (e.g. vehicle 10) detects the other vehicle (e.g. vehicle 11), the sum of the stopping distances of both vehicles 10 and 11, that is f stop (v1)+f stop (v2) must be shorter than the distance max (S1 (tc), S2 (tc)) which is a greater distance of the effective detection distances of the obstacle sensors 34 (if the obstacle sensor 34 of the vehicle 10 detects the other vehicle 11 first, then S1 (tc)).

Here the stopping distance of a vehicle is generally a function of the velocity of the vehicle when deceleration started, therefore, the stopping distances of the vehicles 10 and 11 are denoted as f stop (v1), which is a function of the velocity v1 when the vehicle 10 started deceleration, and f stop (v2), which is a function of the velocity v2 when the vehicle 11 started deceleration respectively (Step 111).

When the velocities of the respective vehicles 10 and 11 at the start of deceleration which satisfy the above expression (2), that is, velocities v1 and v2 at which both vehicles can stop without interference, are determined in Step 111, the vehicle 10 transmits the velocity control command, for making the velocity V of the other vehicle 11 to be the above stop-possible velocity v2 at the estimated time tc when the vehicles are traveling on-coming to each other, to the other vehicle 11 via the inter-vehicle communication equipment 6 (Step 112).

The vehicle 10 controls its velocity v to be the above stop-possible velocity v1 at the estimated time tc when the vehicle 10 and vehicle 11 are traveling on-coming to each other. This means that the brake, transmission and engine rotation speed are controlled by the vehicle control equipment 35 of the vehicle 10 (Step 113).

The procedure of the Step 112 and Step 113 may be reversed.

When the vehicle 10 transmits the velocity control command to the other vehicle 11 via the inter-vehicle communication equipment 6, the velocity is automatically controlled according to the content of this control command. In other words, the brake, transmission and engine rotation speed are controlled by the vehicle control equipment 35 of the vehicle 11 so that the velocity becomes the above stop-possible velocity v2 at the estimated time tc.

When time t actually reaches the estimated time tc, and one vehicle (e.g. vehicle 10) detects the other vehicle (e.g. vehicle 11) by the obstacle sensor 34, the vehicle 10, which detected the other vehicle 11, starts deceleration itself. This means that the brake is controlled by the vehicle control equipment 35 of the vehicle 10 so as to start deceleration at this estimated time tc for stopping.

The vehicle 10, which detected the other vehicle 11, on the other hand, transmits the deceleration control command for stopping the other vehicle 11, to the other vehicle 11 via the inter-vehicle communication equipment 6. When the deceleration control command is transmitted from the vehicle 10 to the other vehicle 11 via the inter-vehicle communication equipment 6, the velocity is automatically controlled according to the content of the control command. In other words, the brake is controlled by the vehicle control equipment 35 of the other vehicle 11 so as to start deceleration at this estimated time tc for stopping.

In this way, interference of the vehicles 10 and 11 is prevented.

Interference Prevention When the Other Vehicle is a Manned Vehicle

Figure 6:
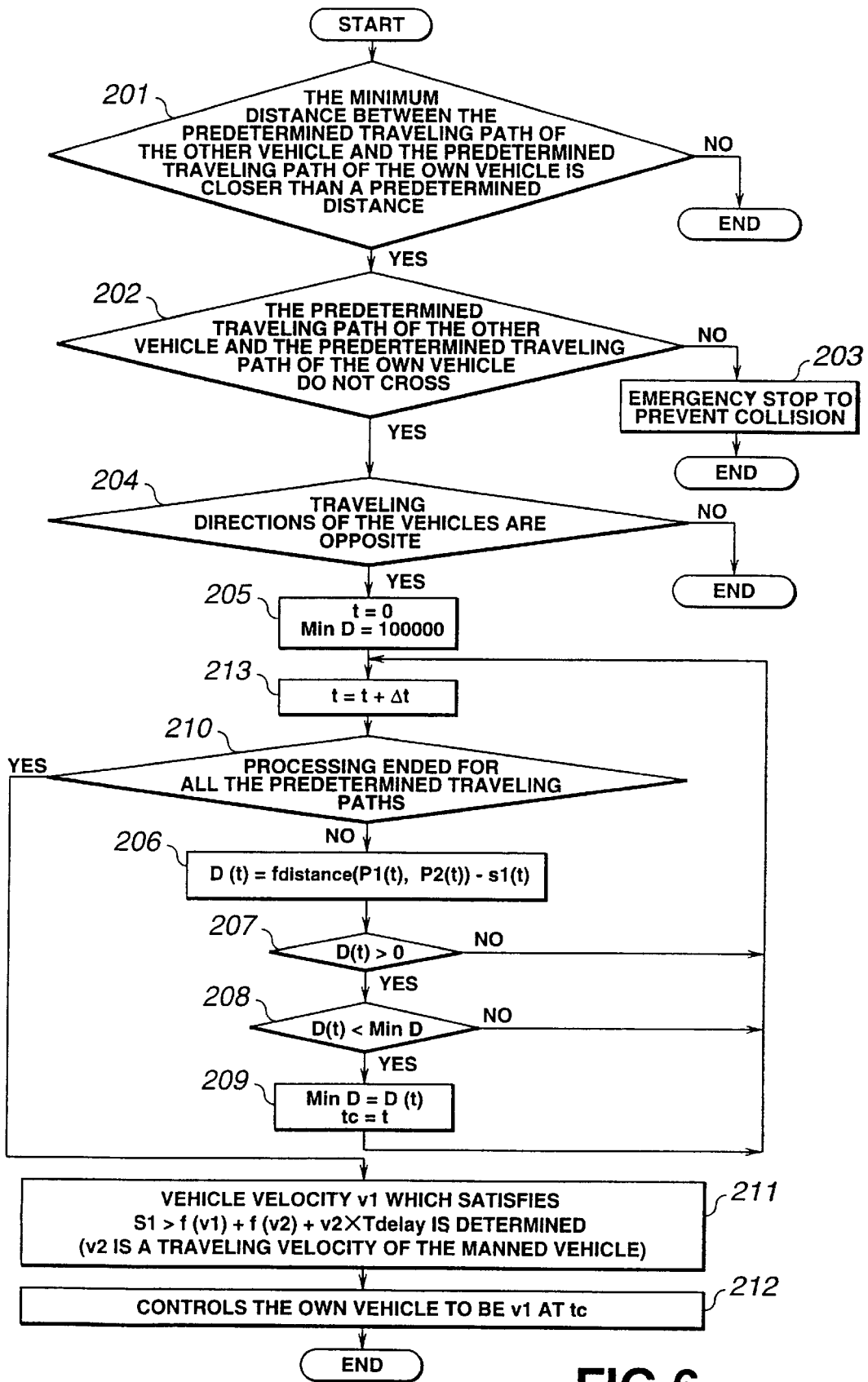
FIG. 6 is a flow chart depicting a processing procedure of the interference prevention control when an unmanned vehicle and a manned vehicle are traveling on-coming to each other.

FIG. 6 is a processing procedure shown in FIG. 7 to be applied when one of the vehicles, which comes from the opposite direction and passes the other vehicle on the traveling path 50, is a manned vehicle.

Here the portions common with the processing in FIG. 5 is omitted and only the different portions will be explained. It is assumed that the vehicle 10 is an unmanned vehicle and the vehicle 11 is a manned vehicle.

In Step 201–Step 205, the same processing as Step 101–Step 105 in FIG. 5 is executed.

To determine D (t) in Step 206, the following expression (3) is used.

$$D\ (t) = f\ \text{distance}\ (P1\ (t),\ P2\ (t)) - S1\ (t) \tag{3}$$

Since the manned vehicle 11 does not have the obstacle sensor 34, the second term of the right side of the expression (3) is only the effective detection distance S1 (t) of the obstacle sensor 34 of the unmanned vehicle 10. It is, of course, possible to provide the obstacle sensor 34 to the manned vehicle 11 (Step 206).

In Step 207–Step 209, the same processing as Step 107–Step 109 in FIG. 5 is executed, and in Step 213 and Step 210, the same processing as Step 114 and Step 110 in FIG. 5 is executed.

To determine the stop-possible velocities v1 and v2 in the next step, Step 211, the following expression (4) is used.

$$S1\ (tc) > f\ \text{stop}\ (v1) + f\ \text{stop}\ (v2) + v2 \cdot \text{Tdelay} \tag{4}$$

Since the manned vehicle 11 does not have the obstacle sensor 34, the left side of the expression (4) has only the effective detection distance S1 (t) of the obstacle sensor 34 of the unmanned vehicle 10. In the third term of the right side, idle running distance v2·Tdelay, which corresponds to the delay time Tdelay, from receiving the deceleration control command to the actual start of the operation for deceleration, generated due to the manned vehicle, is added (Step 211).

In this way, the delay time Tdelay until the actual start of the deceleration operation is included when the stop-possible velocities v1 and v2 of the respective vehicles 10 and 11 are computed using the expression (4) in the same way as the above expression (2). In the case of the manned vehicle 11, however, the velocity changes according to the operator's control, so the stop-possible velocity is the same as the current velocity v2, and the manned vehicle 11 is not required to control (decelerate) the velocity until the estimated time tc comes (there is no processing corresponding to Step 112).

The unmanned vehicle, vehicle 10, on the other hand, controls its velocity v so that the velocity becomes the stop-possible velocity v1 at the estimated time tc when the vehicles are traveling on-coming to each other. This means that the brake, transmission and engine rotation speed are controlled by the vehicle control equipment 35 of the vehicle 10 (Step 212).

When time t actually reaches the estimated time tc and the vehicle 10 detects the other vehicle 11 by the obstacle sensor 34, the vehicle 10, which detected the other vehicle 11, starts deceleration itself. This means that the brake is controlled by the vehicle control equipment 35 of the vehicle 10 so as to start deceleration at this estimated time tc for stopping.

The vehicle 10, which detected the other vehicle 11, on the other hand, transmits the deceleration control command for stopping the other vehicle 11, to the other vehicle 11 via the inter-vehicle communication equipment 6. When the deceleration control command is transmitted from the vehicle 10 to the other vehicle 11 via the inter-vehicle communication equipment 6, the content of the deceleration control command is displayed on the screen of the display 36 of the manned vehicle, vehicle 11. The content of the deceleration control command may be notified to the operator by a buzzer sound, for example.

There is a type of manned vehicle which automatically starts deceleration control and a type which does not automatically start deceleration control (manual control by operator only) when an operator does not operate for deceleration, even if a predetermined time has elapsed after the deceleration control command is displayed on the screen of the display 36.

In the case of the type which automatically starts deceleration control, the above mentioned predetermined time, from the display of the deceleration control command to the start of automatic deceleration control, corresponds to the delay time Tdelay in the above expression (4). In the case of the type which does not automatically start deceleration control, the response delay time expected due to the operator, from the display of the deceleration control command to the actual start of operation for deceleration, corresponds to the delay time Tdelay in the above expression (4).

In this way, in the manned vehicle 11, automatic deceleration control or manual deceleration control starts when the delay time Tdelay elapses after the estimated time tc when the content of the deceleration control command is displayed. This means that the brake is controlled by the vehicle control equipment 35' of the vehicle 11 for stopping.

In this way, interference of vehicle 10 and 11 is prevented.

In this embodiment, only velocity control for preventing interference was explained, but traveling direction control may be included when appropriate.

In other words, if one of the vehicles (e.g. vehicle 10) detects the other vehicle (e.g. vehicle 11) by its obstacle sensor 34 when the vehicle 10 and 11 pass each other, the vehicle 10 may start traveling direction change control to change its traveling direction toward the safer road side strip 51 of the traveling path 50 (see FIG. 7 and FIG. 8), which is the direction to avoid collision, and at the same time, the vehicle 10 may transmit the traveling direction change control command to the vehicle 11 via the inter-vehicle communication equipment 6 so as to change the traveling direction of the other vehicle 11 toward the safer road side strip 52 of the traveling path 50 (see FIG. 7 and FIG. 8). If the other vehicle 11 is the unmanned vehicle, in this case, the traveling direction can be automatically controlled according to the content of the traveling direction change control command when the traveling direction change control command is transmitted from the vehicle 10 via the inter-vehicle communication equipment 6. In other words, when the traveling direction change control command is input to the vehicle control equipment 35 of the other vehicle 11, the steering angle is controlled so that the traveling direction of the vehicle 11 is changed toward the road side strip 52.

When a plurality of sensors are disposed in the axle direction as the obstacle sensor 34, the present invention may be embodied such that the deceleration control command is transmitted to the other vehicle 11 via the inter-vehicle communication equipment 6 only when a sensor positioned toward the center in the axle direction among the plurality of sensors detects the other vehicle 11, and the deceleration control command is not transmitted when a sensor positioned toward the edge in the axle direction among the plurality of the sensors detects the other vehicle 11, regarding that the sensor detects an obstacle other than the vehicle which exists at the road side strip.

The mutual interference of the vehicles may be prevented by simultaneously executing the above deceleration control and the above traveling direction change control, or may be prevented by executing only deceleration control.

In the present embodiment, the case when two vehicles pass each other on a 2-lane traveling path is assumed, but the present invention can be applied to the case when three or more vehicles pass each other on a 3- or more lane traveling path.

Next the second aspect of the invention will be explained with reference to FIG. 10–FIG. 15.

Figure 10:
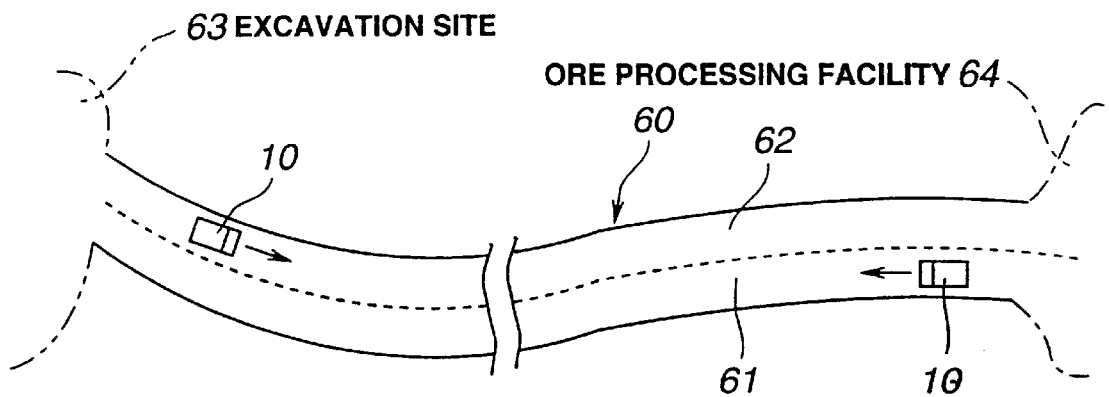
FIG. 10 is a conceptual diagram depicting an example of a traveling course in accordance with an embodiment of the second aspect of the present invention.

As FIG. 10 shows, unmanned off road dump trucks 10 (hereafter unmanned vehicles) are traveling on the traveling course 60 created between an excavation site 63 and the ore processing facility 64 of a mine.

The traveling course 60 is comprised of the lane 61 for going and the lane 62 for coming which are adjacent to each other, therefore an unmanned vehicle 10 traveling on the lane 61 and an unmanned vehicle 10 traveling on the lane 62 pass each other.

Figure 11:
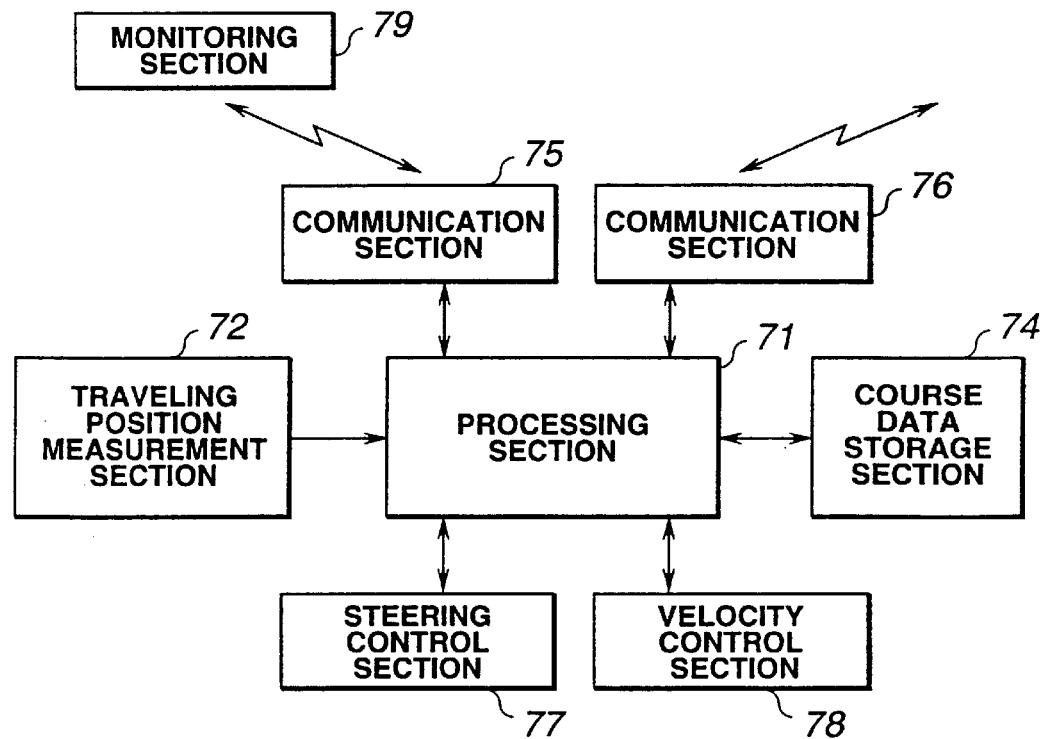
FIG. 11 is a block diagram depicting an embodiment of a traveling control system in accordance with the second aspect of the present invention.

As FIG. 11 shows, an unmanned vehicle 10 comprises a processing section 71, a traveling position measurement section 72, a course data storage section 74, a communication section 75 for communication with the monitoring station 79, and a communication section 76 for communicating with another unmanned vehicle 10.

The communication section 75 has a wide communication range, and the communication section 76 has a local communication range.

The position measurement section 72 is for measuring the current traveling position of the unmanned vehicle 10 using GPS (Global Positioning System), a tire rotation speed sensor for obtaining traveling distance information, and an optical fiber gyro for obtaining traveling direction information.

For teaching on the lanes 61 and 62, the operator actually drives the unmanned vehicle 10 on the lanes 61 and 62. At this time, the processing section 71 stores the traveling position data at each predetermined time measured by the position measurement section 72 in the course data storage section 72, therefore, the traveling locus indicating the lanes 61 and 62 are stored in the storage section 74 as the positions of the sequence of points.

When the teaching on the lanes 61 and 62 ends, the unmanned vehicle 10 performs autonomously guided traveling based on the course data stored in the course data storage section 74.

In other words, based on the comparison between the above mentioned course data and the traveling position data which is output from the position measurement section 72, the processing section 71 outputs the steering control command to the steering control section 77 so that the positional deviation of the unmanned vehicle 10 is corrected, whereby the unmanned vehicle 10 travels along the lanes 61 and 62.

At this time, the processing section 71 of each unmanned vehicle 10 periodically transmits the traveling position data of the respective unmanned vehicle 10 to the monitoring station 79 via the above mentioned communication section 75. And based on the above traveling position data, the monitoring station 79 manages the traveling of the respective unmanned vehicles 10 (e.g. instructions on traveling target position).

The above mentioned processing section 71, on the other hand, detects the traveling control errors of the respective unmanned vehicle 10 (left and right direction positional deviation of the actual traveling position from the target position on the course) periodically based on the above course data and traveling position data, and transmits the data on the traveling control errors via the communication section 76.

At the same time, it transmits data on the traveling position, pre-taught traveling velocity, predetermined traveling direction (this is the traveling direction for a predetermined length in which the vehicle 10 is about to travel, which is set based on the above mentioned course data), and transmits data such as a flag to indicate whether the vehicle 10 is an unmanned vehicle or a manned vehicle via the above communication section 76.

And the processing section 71 receives similar data transmitted from the other vehicle 10 via the communication section 76, and at this reception, the processing section 75 stops the transmission operation of the above communication section 77. The traveling velocity of the unmanned vehicle 10 may be measured by an appropriate sensor.

Figure 12:
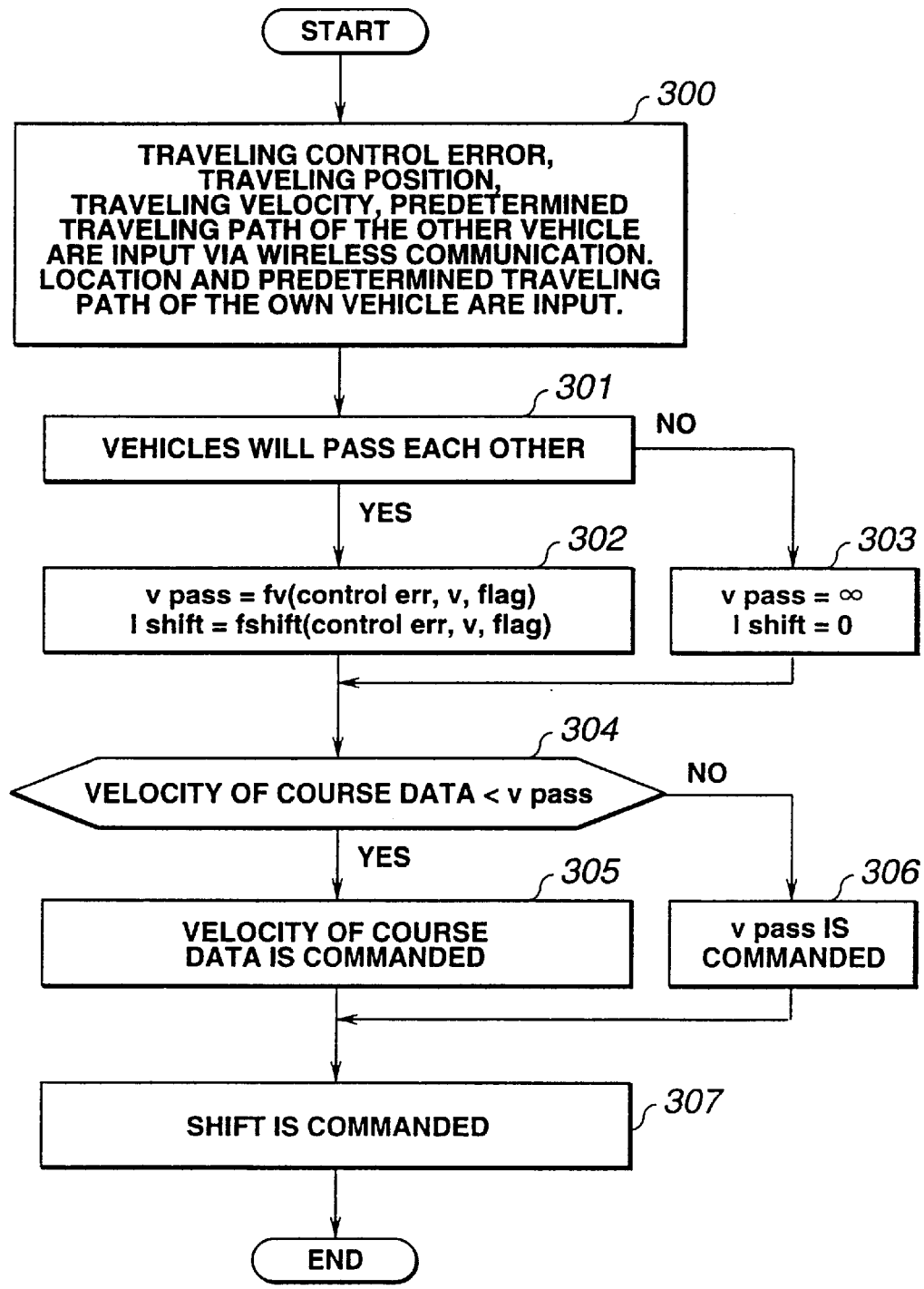
FIG. 12 is a flow chart depicting an example of an interference prevention procedure to be executed at a processing section.
Figure 16:
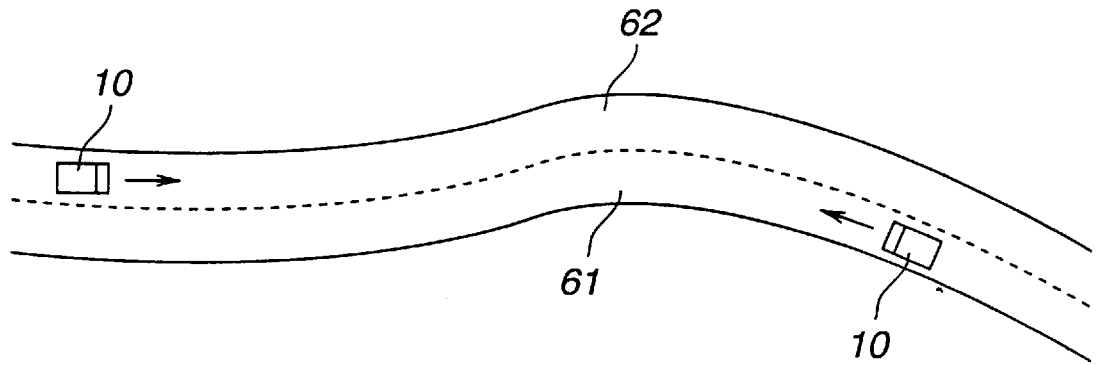
FIG. 16 is a conceptual diagram depicting an example of a traveling course.
Figure 17:
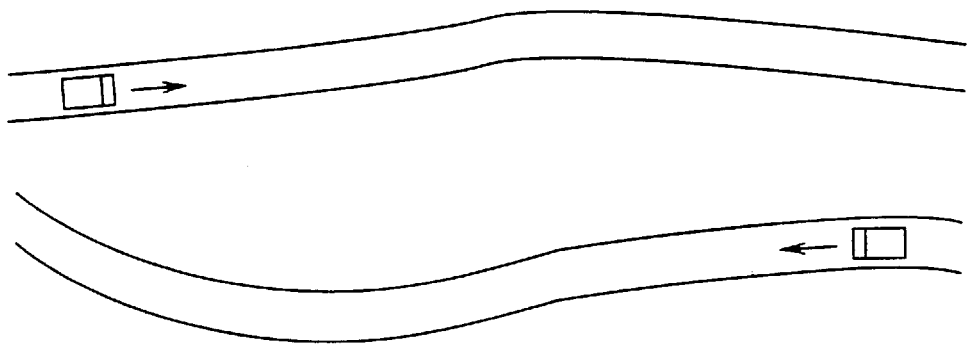
FIG. 17 is a conceptual diagram depicting a configuration example of a traveling course.
Figure 18:
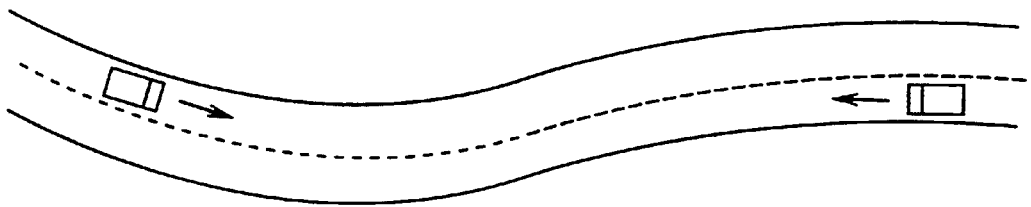
FIG. 18 is a conceptual diagram depicting another configuration example of a traveling course.
Figure 19:
FIG. 19 is a conceptual diagram depicting still another configuration example of a traveling course.

FIG. 12 shows an example of an interference prevention procedure when the unmanned vehicle 10 traveling on the lane 61 and the unmanned vehicle 10 traveling on the lane 62 pass each other, and this procedure is executed by the above mentioned processing section 71.

In this procedure, such data as traveling control errors, traveling position, traveling velocity, predetermined traveling path, and the manned/unmanned judgment flag of the other vehicle 10 are input via wireless communication, and the position and predetermined traveling path of the own vehicle 10 are input (Step 300).

In the next Step 301, it is judged whether the vehicles will pass each other. In the Step 301, vehicle 10 judges whether the other vehicle 10 exists on its predetermined traveling path, although this is not illustrated, and if the other vehicle 10 exists, there is a danger that the vehicle 10 will catch up with the other vehicle 10, therefore the vehicle 10 controls its traveling velocity to be the same as the traveling velocity of the other vehicle 10, or controls itself to stop.

Also the vehicle 10 judges whether the predetermined traveling path of the vehicle 10 crosses with that of the other vehicle 10, and if the predetermined traveling paths cross, there is a danger that both vehicles will interfere, therefore the vehicle 10 compares the estimated arrival times of the respective vehicles to the cross-section, and stops one of the vehicles 10 which has an estimated arrival time that is longer.

When the distance to the cross-section for this vehicle 10 having the longer estimated arrival time is 1.5 times the minimum stopping distance or less, both vehicles are stopped.

The vehicles which approach predetermined distances on the respective predetermined traveling paths which do not cross, will pass each other. In Step 301, it is judged whether the vehicles will pass each other based on such conditions.

When it is judged that the vehicles will pass each other in Step 301, the velocity at passing v pass of the vehicle, denoted in the following expression (5), is set, and the shift length l shift of the vehicle denoted in the following expression (6) is set.

$$v \text{ pass} = fv \text{ (control err, } v, \text{ flag)} \quad (5)$$

$$l \text{ shift} = f \text{ shift (control err, } v, \text{ flag)} \quad (6)$$

Where control err: traveling control error of the other vehicle v: traveling velocity of the other vehicle flag: flag to denote whether the other vehicle is a manned vehicle In other words, the velocity at passing v pass and the shift length l shift of the vehicle when passing the other vehicle are determined by the function fv and the function f shift with the control err, v and flag as parameters.

Specifically, the velocity at passing v pass is decreased as the traveling control errors and the traveling velocity of the other vehicle increase, and is decreased when the other vehicle is a manned vehicle.

The shift length l shift is increased as the traveling control error and the traveling velocity of the other vehicle increase, and is increased when the other vehicle is a manned vehicle.

The above mentioned manned vehicle is, for example, a grader for road repair, a work vehicle for transporting workers and fuel, or a monitoring vehicle for monitoring unmanned vehicle. The manned vehicle does not have an automatic steering apparatus, but has a control system corresponding to the control system shown in FIG. 11. The manned vehicle, of course, transmits a flag denoting that the vehicle is a manned vehicle.

When it is judged that the vehicles will not pass each other in Step 301, the above velocity of passing v pass is set to a predetermined upper limit value, the above shift length l shift is set to 0 (Step 303), and the procedure advances to the Step 304.

In Step 304, it is judged whether the pre-taught traveling velocity is smaller than the velocity at passing being set based on the above expression (5). If the judgment result in Step 304 is YES, the pre-taught traveling velocity is commanded to the velocity control section 78 (Step 305), and if the judgment is NO, the velocity at passing v pass is commanded to the velocity control section 78 (Step 306).

As a result, the velocity control section 78 controls the throttle so that the traveling velocity corresponding to the above command can be obtained.

In the next step, Step 307, the vehicle 10 outputs a command to the steering control section 77 so that this vehicle 10 is shifted toward the road shoulder side for the above shift length l shift. As a result, the steering of this vehicle 10 is controlled and this vehicle 10 is shifted toward the road shoulder side for the predetermined length. This shift is implemented by changing the target position on the course data.

When it is judged that passing completes, although this is not illustrated, traveling based on the pre-taught course data at the pre-taught traveling velocity is executed again.

According to the above procedure, if the vehicles do not pass each other, the unmanned vehicle travels near the center of the path at high-speed (see FIG. 13), and when the vehicles pass each other, the unmanned vehicle 10 is shifted toward the road shoulder side and travels at low-speed (see FIG. 14).

The traveling control error of the vehicle is smaller during low speed than at high-speed, and the arrow marks in FIG. 13 and FIG. 14 indicate this characteristic.

When an unmanned vehicle 10 is traveling at low speed while shifting toward the road shoulder side, as mentioned above, the traveling control error of the vehicle 10 becomes smaller, and the danger to interfere with an obstacle outside the course area decreases.

In the above mentioned unmanned vehicle 10, a plurality of obstacle sensors 80 (which can detect an obstacle, even at curves, since the rotation mechanism of the sensor can turn 90° to the left and right) comprised of millimeter wave radar and laser radar are disposed in the front part of the vehicle, and an infrared type obstacle sensor 81 is disposed on the sides and the rear part of the vehicle.

Therefore when a vehicle traveling behind approaches a vehicle traveling in front abnormally close, or when both of the vehicles are traveling on interference courses, the vehicle behind is stopped based on the output of the above sensors 80.

The above procedure is executed by both of the unmanned vehicles 10 which will pass each other, so according to the above embodiment, both of the unmanned vehicles 10 which will pass each other are shifted toward the road shoulder side (see FIG. 14), and as a result, interference of the unmanned vehicles is effectively prevented.

In the above embodiment, the traveling control error and the traveling velocity of the other vehicle are used as the vehicle state parameters of the function fv to determine the traveling velocity at passing v pass and the function f shift to determine the shift length l shift, but the traveling control error and the traveling velocity of the own vehicle may be used as the parameters of these functions, or the traveling control error and the traveling velocity of the both vehicles to pass each other may be used as the parameters of each function.

The weight of the vehicle may be added as the parameter of the function fv to determine the above traveling velocity v pass, so that the traveling velocity v pass is decreased less as the weight becomes heavier.

If the traveling velocity v pass of the heavy vehicle carrying a full load is decreased to much when passing another vehicle, the time and energy required for acceleration after passing increases, but this problem can be avoided if the traveling velocity v pass to be decreased is decreased as the weight of the vehicle is heavier, as mentioned above.

To execute the above velocity control processing according to the weight of the vehicle, the weight sensor (e.g. detecting oil pressure of suspension) is provided to the unmanned vehicle 10, and the vehicle weight data detected by this sensor is transmitted via the above mentioned communication section 77.

It is preferred that the above velocity control processing is not executed when the weight of both of the vehicles is great, because if the above velocity control processing is executed, the velocity of both of the vehicles may not be limited when passing each other.

In the above embodiment, data is directly transmitted/received between the respective vehicles 10, but the data can be transmitted/received via the above mentioned monitoring station 79.

It is also acceptable that the monitoring station 79 sets the velocity and shift length when both vehicles pass each other based on the data sent from the respective vehicles 10, and transfers the setting result to the respective vehicles 10 via wireless communication.

The inclination of the course where the vehicle is traveling may be added to the parameters of the function fv to determine the above velocity v pass so that when the inclination of the course is great, the traveling velocity v pass of the vehicle climbing a hill is decreased less.

This is because if the traveling velocity v pass when a vehicle climbing a hill is decreased too much when passing another vehicle, the time and energy to be required for acceleration after passing increases. This problem can be avoided if priority is given to the vehicle climbing a hill when determining to decreases the traveling velocity v pass less. A vehicle climbing a hill has a short stopping distance and a vehicle coming down a hill has a long stopping distance, therefore if the velocity of the vehicle climbing a hill is increased and the velocity of the vehicle coming down a hill is decreased, then it is safer to avoid interference between vehicles.

The inclination of a slope may be detected by the inclinometer provided to each vehicle, or may be determined by calculation based on the change of course data in the height direction. For the inclinometer, a general sensor for measuring inclination of the vehicle by the direction of gravity can be used.

Industrial Applicability

The system of the present invention can be applied not only to unmanned vehicles but also to manned vehicles. Also the system of the present invention can be applied not only to vehicles traveling outdoors but also to carriers traveling indoors, e.g. in a factory.

What is claimed is:

1. A vehicle interference prevention system for preventing a mutual interference of on-coming vehicles when a plurality of vehicles traveling on-coming to each other on a traveling path with a predetermined road width, characterized in that:

each one of the plurality of vehicles is provided with obstacle detection means for detecting an obstacle in front of the vehicle in a traveling direction by transmitting electromagnetic waves with directivity forward in the vehicle traveling direction and receiving reflected electromagnetic waves;

each one of the plurality of vehicles is provided with transmission/reception means for transmitting/receiving data on own vehicle to/from other vehicle between the plurality of vehicles via a communication system which enables wireless communication over distances between the plurality of vehicles, so as to transmit/receive information on a spot where the vehicles travel on-coming to each other between the vehicles by the transmission/reception means; and each one of the plurality of vehicles is provided with velocity control means, if a vehicle detects other vehicle by its obstacle detection means when the vehicles are traveling on-coming to each other for starting deceleration for stopping the own vehicle and for transmitting a deceleration control command for stopping the other vehicle to the other vehicle via the transmission/reception means, and if one of the vehicles did not detect the other vehicle by its obstacle detection means and did not receive the deceleration control command from the other vehicle, for allowing the own vehicle to travel without stopping when the vehicles are traveling on-coming to each other.

2. The vehicle interference prevention system according to claim 1, characterized in that the deceleration control means comprises:

estimation means for estimating a spot where the own vehicle and other vehicle are traveling on-coming to each other;

detection distance computing means for computing an effective detection distance of the obstacle detection means of the own vehicle and an effective detection distance of the obstacle detection means of other vehicle at the spot where the vehicles are traveling on-coming to each other estimated by the estimation means, and determining a greater effective detection distance out of these effective detection distances;

approach distance computing means for computing an approach distance of these vehicles at a spot when one vehicle can detect the other vehicle with the effective detection distance computed by the detection distance computing means;

estimated position computing means for computing an estimated position of the own vehicle and an estimated position of other vehicle when the distance between the vehicles becomes the approach distance computed by the approach distance computing means;

velocity computing means for computing a stop-possible velocity, at which vehicles traveling on-coming to each other can stop without mutual interference if the on-coming vehicle starts deceleration from the estimated position computed by the estimated position computing means;

velocity control means for controlling velocity so that a velocity of the own vehicle becomes the stop-possible velocity at the estimated position, and transmitting a velocity control command to the other vehicle via the transmission/reception means so that a velocity of the other vehicle becomes the stop-possible velocity at the estimated position; and deceleration control means for starting deceleration for stopping the own vehicle when the own vehicle detects the other vehicle by its obstacle detection means, and for transmitting a deceleration control command to the other vehicle via the transmission/reception means so that the other vehicle stops.

3. The vehicle interference prevention system according to claim 1, characterized in that the other vehicle is an unmanned vehicle, and has means for automatically controlling velocity according to a content of the control command when the own vehicle transmits the velocity control command or deceleration control command via the transmission/reception means.

4. The vehicle interference prevention system according to claim 1, characterized in that each one of the plurality of vehicles has traveling direction control means for starting traveling direction change control to change a traveling direction of the own vehicle toward a road side strip of the traveling path and for transmitting a traveling direction change control command for changing the traveling direction of the other vehicle toward a road side strip of the traveling path to the other vehicle via the transmission/reception means when one of the vehicles traveling on-coming to each other detects the other vehicle by its obstacle detection means.

5. The vehicle interference prevention system according to claim 3, characterized in that each one of the plurality of vehicles has traveling direction control means for starting traveling direction change control to change a traveling direction of the own vehicle toward a road side strip of the traveling path and for transmitting a traveling direction change control command for changing the traveling direction of the other vehicle toward a road side strip of the traveling path to the other vehicle via the transmission/reception means when one of the vehicles traveling on-coming to each other detects the other vehicle by its obstacle detection means.

6. The vehicle interference prevention system according to claim 4, characterized in that the other vehicle is an unmanned vehicle, and has means for automatically controlling the traveling direction according to a content of the traveling direction change control command when the own vehicle transmits the traveling direction change control command via the transmission/reception means.

7. The vehicle interference prevention system according to claim 5, characterized in that the other vehicle is an unmanned vehicle, and has means for automatically controlling the traveling direction according to a content of the traveling direction change control command when the own vehicle transmits the traveling direction change control command via the transmission/reception means.

8. The vehicle interference prevention system according to claim 1, characterized in that the obstacle detection means comprises a plurality of sensors arranged in an axle direction, the deceleration control command is transmitted to the other vehicle via the transmission/reception means only when a sensor located near a center in the axle direction among these sensors detects the other vehicle, and the deceleration control command is not transmitted when a sensor located near an edge in the axle direction among these sensors detects the other vehicle.

9. The vehicle interference prevention system according to claim 3, characterized in that the obstacle detection means comprises a plurality of sensors arranged in an axle direction, the deceleration control command is transmitted to the other vehicle via the transmission/reception means only when a sensor located near a center in the axle direction among these sensors detects the other vehicle, and the deceleration control command is not transmitted when a sensor located near an edge in the axle direction among these sensors detects the other vehicle.

10. The vehicle interference prevention system according to claim 4, characterized in that the obstacle detection means comprises a plurality of sensors arranged in an axle direction, the deceleration control command is transmitted to the other vehicle via the transmission/reception means only when a sensor located near a center in the axle direction among these sensors detects the other vehicle, and the deceleration control command is not transmitted when a sensor located near an edge in the axle direction among these sensors detects the other vehicle.

11. The vehicle interference prevention system according to claim 5, characterized in that the obstacle detection means comprises a plurality of sensors arranged in an axle direction, the deceleration control command is transmitted to the other vehicle via the transmission/reception means only when a sensor located near a center in the axle direction among these sensors detects the other vehicle, and the deceleration control command is not transmitted when a sensor located near an edge in the axle direction among these sensors detects the other vehicle.

12. The vehicle interference prevention system according to claim 6, characterized in that the obstacle detection means comprises a plurality of sensors arranged in an axle direction, the deceleration control command is transmitted to the other vehicle via the transmission/reception means only when a sensor located near a center in the axle direction among these sensors detects the other vehicle, and the deceleration control command is not transmitted when a sensor located near an edge in the axle direction among these sensors detects the other vehicle.

13. The vehicle interference prevention system according to claim 7, characterized in that the obstacle detection means comprises a plurality of sensors arranged in an axle direction, the deceleration control command is transmitted to the other vehicle via the transmission/reception means only when a sensor located near a center in the axle direction among these sensors detects the other vehicle, and the deceleration control command is not transmitted when a sensor located near an edge in the axle direction among these sensors detects the other vehicle.

14. The vehicle interference prevention system according to claim 4, characterized in that the obstacle detection means comprises a plurality of sensors arranged in an axle direction, the deceleration control command and the traveling direction change control command are transmitted to the other vehicle via the transmission/reception means only when a sensor located near a center in the axle direction among these sensors detects the other vehicle, and the deceleration control command and the traveling direction change control command are not transmitted when a sensor located near an edge in the axle direction among these sensors detects the other vehicle.

15. The vehicle interference prevention system according to claim 5, characterized in that the obstacle detection means comprises a plurality of sensors arranged in an axle direction, the deceleration control command and the traveling direction change control command are transmitted to the other vehicle via the transmission/reception means only when a sensor located near a center in the axle direction among these sensors detects the other vehicle, and the deceleration control command and the traveling direction change control command are not transmitted when a sensor located near an edge in the axle direction among these sensors detects the other vehicle.

16. The vehicle interference prevention system according to claim 6, characterized in that the obstacle detection means comprises a plurality of sensors arranged in an axle direction, the deceleration control command and the traveling direction change control command are transmitted to the other vehicle via the transmission/reception means only when a sensor located near a center in the axle direction among these sensors detects the other vehicle, and the deceleration control command and the traveling direction change control command are not transmitted when a sensor located near an edge in the axle direction among these sensors detects the other vehicle.

17. The vehicle interference prevention system according to claim 7, characterized in that the obstacle detection means comprises a plurality of sensors arranged in an axle direction, the deceleration control command and the traveling direction change control command are transmitted to the other vehicle via the transmission/reception means only when a sensor located near a center in the axle direction among these sensors detects the other vehicle, and the deceleration control command and the traveling direction change control command are not transmitted when a sensor located near an edge in the axle direction among these sensors detects the other vehicle.

18. A vehicle interference prevention system to be applied when unmanned vehicles using autonomous guidance traveling based on course data and traveling position data or when an unmanned vehicle and a manned vehicle pass each other on adjacent going and coming paths, providing the unmanned vehicle with obstacle detection means for detecting an object in front of the vehicle in the traveling direction by transmitting electromagnetic waves forward in the vehicle traveling direction and receiving reflected electromagnetic waves, providing each one of the vehicles with communication means for transmitting traveling position data on the own vehicle and for receiving traveling position data on the other vehicle, and providing the unmanned vehicle with approach detection means for detecting the approach of the other vehicle based on the traveling position data on the own vehicle and traveling position data on the other vehicle, and traveling control means for shifting the own vehicle toward the road shoulder at the detection of an approach.

19. The vehicle interference prevention system according to claim 18, characterized in that the unmanned vehicle is provided with velocity control means for decreasing the traveling velocity of the own vehicle at the detection of approach.

20. The vehicle interference prevention system according to claim 18, characterized in that transmission data of each vehicle includes data on traveling state of the own vehicle, and the traveling control means of the unmanned vehicle is provided with means for setting the shift length based on the data on traveling state.

21. The vehicle interference prevention system according to claim 20, characterized in that the means for changing the shift length sets the shift length based on the data on the traveling state of the other vehicle.

22. The vehicle interference prevention system according to claim 20, characterized in that the means for setting the shift length sets the shift length based on the data on the traveling state of the own vehicle.

23. The vehicle interference prevention system according to claim 20, characterized in that the means for setting the shift length sets the shift length based on the data on traveling states of the own vehicle and the other vehicle.

24. The vehicle interference prevention system according to claim 19, characterized in that data on the traveling state of the own vehicle is included in the transmission data of each vehicle, and the velocity control means of the unmanned vehicle has means for setting deceleration amount of the velocity based on the data on the traveling state.

25. The vehicle interference prevention system according to claim 24, characterized in that the means for setting the deceleration amount sets the deceleration amount based on the data on the traveling state of the other vehicle.

26. The vehicle interference prevention system according to claim 24, characterized in that the means for setting the deceleration amount sets the deceleration amount based on the data on the traveling state of the own vehicle.

27. The vehicle interference prevention system according to claim 24, characterized in that the means for setting the deceleration amount sets the deceleration amount based on the data on traveling states of the own vehicle and the other vehicle.

28. The vehicle interference prevention system according to claim 20, characterized in that the quantity of state is a traveling control error.

29. The vehicle interference prevention system according to claim 20, characterized in that the quantity of state is the traveling velocity.

30. The vehicle interference prevention system according to claim 20, characterized in that the quantity of state is a vehicle weight.

31. The vehicle interference prevention system according to claim 20, characterized in that the quantity of state is that the other vehicle is a manned vehicle.

32. The vehicle interference prevention system according to claim 20, characterized in that the quantity of state is an inclination of the traveling course of the vehicle.

* * * * *